United States Patent
Takizawa

(10) Patent No.: US 9,136,775 B2
(45) Date of Patent: Sep. 15, 2015

(54) CONTROL METHOD FOR MULTILEVEL POWER CONVERSION CIRCUIT

(71) Applicant: FUJI ELECTRIC CO., LTD., Kawasaki-shi (JP)

(72) Inventor: Satoki Takizawa, Hino (JP)

(73) Assignee: FUJI ELECTRIC CO., LTD. (JP)

( * ) Notice: Subject to any disclaimer, the term of this patent is extended or adjusted under 35 U.S.C. 154(b) by 212 days.

(21) Appl. No.: 13/915,836

(22) Filed: Jun. 12, 2013

(65) Prior Publication Data

US 2014/0009984 A1 Jan. 9, 2014

(30) Foreign Application Priority Data

Jul. 9, 2012 (JP) .................................. 2012-153204

(51) Int. Cl.
*H02M 7/487* (2007.01)
*H02M 7/00* (2006.01)

(52) U.S. Cl.
CPC ................ *H02M 7/00* (2013.01); *H02M 7/487* (2013.01)

(58) Field of Classification Search
CPC ................ H02M 7/487; H02M 7/483; H02M 2007/4835; H02M 7/797; H02M 3/06; H02M 1/143; H02M 1/12
See application file for complete search history.

(56) References Cited

U.S. PATENT DOCUMENTS

| | | | |
|---|---|---|---|
| 6,480,403 B1 * | 11/2002 | Bijlenga | 363/98 |
| 2008/0315859 A1 | 12/2008 | Ponnaluri et al. | |
| 2009/0195068 A1 | 8/2009 | Ohashi et al. | |
| 2011/0280052 A1 * | 11/2011 | Al-Haddad et al. | 363/84 |

FOREIGN PATENT DOCUMENTS

| | | |
|---|---|---|
| JP | 2007-202251 A | 8/2007 |
| JP | 2009-525717 A | 7/2009 |
| JP | 2009-177951 A | 8/2009 |

* cited by examiner

*Primary Examiner* — Harry Behm
(74) *Attorney, Agent, or Firm* — Rossi, Kimms & McDowell LLP

(57) ABSTRACT

In a process of changing an AC voltage from zero to +Ed (or negative to positive) or from zero to −Ed (or positive to negative), a control method in accordance with some aspects of the invention detects voltage across the capacitors and when the detected voltage is lower than a predetermined voltage value, switching operation pattern capable of charging the capacitor is given to the switching elements during a short period of time; when the detected voltage is higher than the predetermined voltage value, a switching operation pattern capable of discharging the capacitor is given to the switching elements during a short period of time. Thus, the width of voltage variation of the capacitors is limited within a specified variation range.

8 Claims, 22 Drawing Sheets

S9 OFF
S8 ON

S10 OFF
S7 ON

S4 OFF
S3 ON

S5 OFF
S2 ON

S9 OFF
S8 ON

S10 OFF
S7 ON

S4 OFF
S3 ON

S10 OFF
S7 ON

S9 OFF
S8 ON

S4 OFF
S3 ON

S9 OFF
S8 ON

S10 OFF
S7 ON

S10 OFF
S7 ON

S4 OFF
S3 ON

S9 OFF
S8 ON

S10 OFF
S7 ON

S5 OFF
S2 ON

S9 OFF
S8 ON

FIG. 11

Charging and discharging states of capacitors in the forced patterns in the process of the transition from 0 to -Ed, in case of positive output current

|  | Ex 1a | Ex 2a | Ex 3a | Ex 4a | Ex 5a | Ex 6a | Ex 7a | Ex 8a |
|---|---|---|---|---|---|---|---|---|
| C1a | *charge* | *charge* | *discharge* | *charge* | *discharge* | *charge* | *discharge* | *discharge* |
| C2 | charge | *discharge* | *discharge* | *discharge* | charge | charge | charge | *charge* |
| C1b | discharge | charge | charge | charge | discharge | discharge | discharge | charge |

The "charge" and "discharge" in italic, bold type indicate operation that delivers forced operation patterns.

FIG. 12

Selection of forced patterns

| | mode 1 | mode 2 | mode 3 | mode 4 | mode 5 | mode 6 | mode 7 | mode 8 |
|---|---|---|---|---|---|---|---|---|
| C1a voltage | low (needs charging) | | | | high (needs discharging) | | | |
| C2 voltage | low | | high | | low | | high | |
| C1b voltage | low | high | low | high | low | high | low | high |
| selected pattern | Ex 2a Ex 4a | Ex 1a Ex 6a | Ex 2a Ex 4a | Ex 1a Ex 2a Ex 4a Ex 6a | Ex 8a | Ex 5a Ex 7a | Ex 3a | Ex 3a Ex 5a Ex 7a |

FIG. 13

Operation patterns in the process of transition from 0 to Ed in the case of positive current

| | | S1 | S2 | S3 | S4 | S5 | S6 | S7 | S8 | S9 | S10 | S11 | S12 | AC voltage | C1a |
|---|---|---|---|---|---|---|---|---|---|---|---|---|---|---|---|
| Ex 1b | (a) | × | ○ | ○ | × | × | × | ○ | ○ | × | × | ○ | ○ | 0 | |
| | (b) | × | ○ | ○ | × | × | × | ○ | × | ○ | × | ○ | ○ | Ed | discharge |
| | (c) | × | ○ | × | ○ | × | × | ○ | × | ○ | × | ○ | ○ | 0 | discharge |
| | (d) | × | ○ | × | ○ | × | × | × | × | ○ | ○ | ○ | ○ | Ed | |
| Ex 2b | (a) | × | ○ | ○ | × | × | × | ○ | ○ | × | × | ○ | ○ | 0 | |
| | (b) | × | ○ | ○ | × | × | × | ○ | × | ○ | × | ○ | ○ | Ed | discharge |
| | (c) | × | × | ○ | × | ○ | × | ○ | × | ○ | × | ○ | ○ | 0 | discharge |
| | (d) | × | × | ○ | × | ○ | × | × | × | ○ | ○ | ○ | ○ | Ed | |
| Ex 3b | (a) | × | ○ | ○ | × | × | × | ○ | ○ | × | × | ○ | ○ | 0 | |
| | (b) | × | × | ○ | × | × | × | ○ | ○ | × | × | ○ | ○ | −Ed | |
| | (c) | × | × | ○ | × | ○ | × | ○ | × | ○ | × | ○ | ○ | 0 | charge |
| | (d) | × | × | ○ | × | ○ | × | × | × | ○ | ○ | ○ | ○ | Ed | |
| Ex 4b | (a) | × | ○ | ○ | × | × | × | ○ | ○ | × | × | ○ | ○ | 0 | |
| | (b) | × | × | ○ | × | ○ | × | ○ | ○ | × | × | ○ | ○ | −Ed | |
| | (c) | × | ○ | × | ○ | × | × | ○ | × | ○ | × | ○ | ○ | 0 | charge |
| | (d) | × | × | ○ | × | ○ | × | × | × | ○ | ○ | ○ | ○ | Ed | |
| Ex 5b | (a) | × | ○ | ○ | × | × | × | ○ | ○ | × | × | ○ | ○ | 0 | |
| | (b) | × | ○ | × | ○ | × | × | ○ | ○ | × | × | ○ | ○ | −Ed | |
| | (c) | × | ○ | × | ○ | × | × | ○ | × | ○ | × | ○ | ○ | 0 | charge |
| | (d) | × | ○ | × | ○ | × | × | × | × | ○ | ○ | ○ | ○ | Ed | |
| Ex 6b | (a) | × | ○ | ○ | × | × | × | ○ | ○ | × | × | ○ | ○ | 0 | |
| | (b) | × | ○ | × | ○ | × | × | ○ | ○ | × | × | ○ | ○ | −Ed | |
| | (c) | × | ○ | × | ○ | × | × | ○ | × | ○ | × | ○ | ○ | 0 | discharge |
| | (d) | × | ○ | × | ○ | × | × | × | × | ○ | ○ | ○ | ○ | Ed | |
| Ex 7b | (a) | × | ○ | ○ | × | × | × | ○ | ○ | × | × | ○ | ○ | 0 | |
| | (b) | × | ○ | ○ | × | × | × | × | × | ○ | ○ | ○ | ○ | Ed | charge |
| | (c) | × | ○ | × | ○ | × | × | ○ | × | ○ | × | ○ | ○ | 0 | charge |
| | (d) | × | ○ | × | ○ | × | × | × | × | ○ | ○ | ○ | ○ | Ed | |
| Ex 8b | (a) | × | ○ | ○ | × | × | × | ○ | ○ | × | × | ○ | ○ | 0 | |
| | (b) | × | ○ | ○ | × | × | × | × | ○ | × | ○ | ○ | ○ | Ed | charge |
| | (c) | × | × | ○ | × | ○ | × | × | ○ | × | ○ | ○ | ○ | 0 | charge |
| | (d) | × | × | ○ | × | ○ | × | × | × | ○ | ○ | ○ | ○ | Ed | |

○:ON  ×:OFF

CONTROL METHOD FOR MULTILEVEL POWER CONVERSION CIRCUIT

BACKGROUND OF THE INVENTION

1. Field of the Invention

Embodiments of the invention relate to control methods for multilevel power conversion circuits using flying capacitors for AC motor drive.

2. Description of the Related Art

FIG. 14 shows an example of a seven-level inverter circuit, a multilevel power conversion circuit for converting a DC power to an AC power. A DC power supply system with a voltage of 3 Ed×2 consisting of series-connected DC power supplies of DP1 and DP2 has a positive potential terminal P, a negative potential terminal N, and a middle potential terminal M. The DC power supply system can be constructed with an AC power supply system generally using double series connection of rectifiers and large capacity capacitors (not shown in the figure). Semiconductor switches, which are six IGBTs S1 through S6 with antiparallel-connected diodes, are connected in series between the positive potential terminal P and the negative potential terminal N of the DC power supply system. Other semiconductor switches, which are four IGBTs S7 through S10 with antiparallel-connected diodes, are connected in series between the connection point of the IGBT 51 and the IGBT S2 and the connection point of the IGBT S5 and the IGBT S6. An antiparallel-connected circuit of bidirectional semiconductor switches consisting of an IGBT S11 and IGBT S12 is connected between the middle potential terminal M of the DC power supply system and the connection point of the IGBT 8 and the IGBT 9.

The bidirectional semiconductor switch can be composed by anti-parallel connection of reverse-blocking IGBTs as shown in FIG. 14, or alternatively, by combinations of an IGBT without reverse-blocking ability and a diode as shown in FIGS. 15A, 15B, and 15C. Capacitors C1a, C1b, and C2 are so-called flying capacitors and controlled at an average voltage across each capacitor of: Ed for the capacitor C1a, 2Ed for the capacitor C2, and Ed for the capacitor C1b for the case of the voltage of the DC power supply system of 3Ed×2. By means of the voltage supplied by the DC power supplies DP1 and DP2 and charging and discharging process of these capacitors, multilevel voltages between 3Ed and −3Ed at an interval of one Ed are delivered at an AC terminal ACT. Thus, the converter of this circuit construction is a seven-level output inverter that delivers at the AC terminal ACT seven output potentials of P, P−Ed, P−2Ed, 0, N+2Ed, N+Ed, and N by means of ON/OFF operation of the semiconductor switches of the IGBTs and voltages across the three capacitors C1a, C1b, and C2. The circuits described above is a one phase portion AU of a three phase inverter as shown in FIG. 16 composed of three phase-portions of AU, AV, and AW. An AC motor ACM is a load on this power conversion system. FIG. 21 shows a circuit example using semiconductor switches with equal withstand voltages. The series-connected IGBTs S1a through S1d in FIG. 21 correspond to the IGBT S1 in FIG. 14 and the series-connected IGBTs S6a through S6d in FIG. 21 correspond to the IGBT S6 in FIG. 14.

FIG. 18 shows an example of waveform of the output line voltage Vout in PWM control of the seven level inverter of FIG. 21 or FIG. 14. This power conversion system with a one step of voltage change of Ed delivers an output voltage waveform nearer to the sinusoidal waveform as compared with a two level type inverter, thus generating fewer harmonics at low order and reducing switching loss in the semiconductor switches. Therefore, a high efficiency power conversion system can be constructed.

FIG. 17 shows a basic circuit of a multilevel conversion circuit. This circuit is disclosed in a Japanese Translation of PCT International Application No. 2009-525717 (also referred to herein as "Patent Document 1") and comprises IGBTs Q1 through Q6 and a capacitor Cf. Some conversion circuits can be added to the terminals TA and TB to construct a multilevel conversion system.

The seven level inverter circuit of FIG. 14 as described above can deliver seven levels of output potentials: 3 Ed, 2Ed, Ed, 0, −Ed, −2Ed, and −3Ed. The inverter circuit is controlled by performing PWM control and changing-over these seven levels of potentials to deliver voltage similar to the sinusoidal waveform. Here, a step of voltage change generated by the changeover of a switching pattern is preferably Ed in view of breakdown in the motor side. Although a changeover pattern is possible to generate a step of voltage change of 2Ed or 3Ed, such a change-over pattern is normally not carried out for this reason. Thus, the potential at the AC terminal ACT during PWM control changes in transition between the next level of potential in the series of 3Ed−2Ed−Ed−0−(−Ed)−(−2Ed)−(−3Ed).

To avoid complexity in control, in the process of potential change of Ed→0→−Ed at the AC terminal ACT, the zero voltage output pattern in the transition from Ed to zero potential is restricted to the pattern shown in FIG. 19 in which the switches S12, S11, S9, S10, S5, and S4 are in the ON state. The current can flow in the opposite direction depending on the power factor of the load. Similarly, in the process of potential change of −Ed→0→+Ed at the AC terminal ACT, the zero voltage output pattern in the transition from −Ed to zero potential is restricted to the pattern shown in FIG. 20 in which the switches S3, S2, S7, S8, S11, and S12 are in the ON state. The current can flow in the opposite direction depending on the power factor of the load.

In the seven-level inverter circuit of FIG. 14, there are five switching patterns (1) through (5) shown below that deliver an output voltage of −Ed at the AC terminal ACT. Likewise, there are five patterns that deliver an output voltage of +Ed.
 (1) S2, S3, S6, S7, S8, and S11 are in the ON state.
 (2) S4, S5, S8, S10, S11, and S12 are in the ON state.
 (3) S2, S4, S7, S8, S11, and S12 are in the ON state.
 (4) S4, S5, S7, S9, S11, and S12 are in the ON state.
 (5) S3, S5, S7, S8, S11, and S12 are in the ON state.

Switching patterns that deliver an output voltage of −2Ed are following three patterns (1), (2), and (3). Likewise, there are three patterns that deliver an output voltage of 2Ed.
 (1) S3, S5, S6, S7, S8, and S11 are in the ON state.
 (2) S2, S4, S6, S7, S8, and S11 are in the ON state.
 (3) S4, S5, S7, S8, S11, and S12 are in the ON state.

Switching pattern that delivers an output voltage of −3Ed is the following one pattern (1). Likewise, there is one pattern that delivers an output voltage of 3Ed.
 (1) S4, S5, S6, S7, S8, and S11 are in the ON state.

Of these switching patterns, the two patterns (2) and (4) in the five patterns that deliver an output voltage of −Ed use the capacitor C1a. Two more patterns that deliver the output voltage of Ed actually use the capacitor C1a summing up to total of four patterns.

Since the PWM control may output the same switching pattern in at least one carrier period, a capacity of the flying capacitors needs to be designed based on the three parameters of: the range of permitted voltage variation of the capacitor, the integrated current flowing in the capacitor, and the carrier period.

The capacitance needed by a flying capacitor is large in a capacitor with a narrow range of permitted voltage variation, in a capacitor carrying a large current, and in a capacitor with a long carrier period. Since a system using a multilevel inverter generally handles a high voltage of several kilovolts, a capacitor used there should be a film capacitor or an oil capacitor having a large volume, which causes a high cost. Thus, as can be seen from the above discussion, there is a need in the art for an improved control method for a multilevel power conversion circuit.

SUMMARY OF THE INVENTION

Embodiments of the invention address these and other needs. Embodiments of the invention provide a control method for a multilevel power conversion circuit having a flying capacitor with a smaller capacitance than the one required by normal operation.

In order to accomplish the above object, a first aspect of the present invention is a control method for controlling a multilevel power conversion circuit for converting DC power to AC power or AC power to DC power, one phase portion of the power conversion circuit comprising: a first semiconductor switch series circuit that is connected between a positive terminal and a negative terminal of a DC power supply system having the positive terminal, the negative terminal, and a middle terminal, and composed of at least series-connected six semiconductor switches each having an anti-parallel-connected diode; a first capacitor that is connected in parallel to a series circuit of two semiconductor switches connected to a middle point of the first semiconductor switch series circuit; a second capacitor that is connected in parallel to a series circuit of four semiconductor switches, two of which are in a one side of a middle point of the first semiconductor switch series circuit and two of which are in the other side of the middle point of the first semiconductor switch series circuit; a second semiconductor switch series circuit that is connected in parallel to the second capacitor and composed of at least series-connected four semiconductor switches each having an anti-parallel connected diode; a third capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching; wherein the control method delivers a predetermined switching pattern of semiconductor switches when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential.

A second aspect of the present invention is a control method for controlling a multilevel power conversion circuit for converting DC power to AC power or AC power to DC power, one phase portion of the power conversion circuit comprising: a first semiconductor switch series circuit that is connected between a positive terminal and a negative terminal of a DC power supply system having the positive terminal, the negative terminal, and a middle terminal, and composed of at least series-connected six semiconductor switches each having an anti-parallel-connected diode; a first capacitor that is connected in parallel to a series circuit of two semiconductor switches connected to a middle point of the first semiconductor switch series circuit; a second capacitor that is connected in parallel to a series circuit of four semiconductor switches, two of which are in a one side of a middle point of the first semiconductor switch series circuit and two of which are in the other side of the middle point of the first semiconductor switch series circuit; a second semiconductor switch series circuit that is connected in parallel to the second capacitor and composed of at least series-connected four semiconductor switches each having an anti-parallel connected diode; a third capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching; wherein the control method delivers a predetermined switching pattern of semiconductor switches corresponding to a voltage value across at least one of the first, second, and third capacitors when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential.

A third aspect of the present invention is the control method for controlling a multilevel power conversion circuit according to the first or second aspect of the present invention, wherein a period of time for delivering the predetermined switching pattern is shorter than one carrier period of pulse width modulation control.

A fourth aspect of the present invention is the control method for controlling a multilevel power conversion circuit according to the first or second aspect of the present invention, wherein selection of switching pattern is determined corresponding to preliminarily detected voltage values across the first, second, and third capacitors.

A fifth aspect of the present invention is the control method for controlling a multilevel power conversion circuit according to the fourth aspect of the present invention, wherein the selection of switching pattern is determined corresponding to the voltage value across the third capacitor in first preference.

A sixth aspect of the present invention is a control method for controlling a multilevel power conversion circuit for converting DC power to AC power or AC power to DC power, one phase portion of the power conversion circuit comprising: a first semiconductor switch series circuit that is connected between a positive terminal and a negative terminal of a DC power supply system having the positive terminal, the negative terminal, and a middle terminal, and composed of at least series-connected eight semiconductor switches each having an anti-parallel-connected diode; a first capacitor that is connected in parallel to a series circuit of two semiconductor switches connected to a middle point of the first semiconductor switch series circuit; a second capacitor that is connected in parallel to a series circuit of four semiconductor switches, two of which are in a one side of a middle point of the first semiconductor switch series circuit and two of which are in the other side of the middle point of the first semiconductor switch series circuit; a third capacitor that is connected in parallel to a series circuit of six semiconductor switches, three of which are in a one side of a middle point of the first semiconductor series circuit and other three of which are in the other side of the middle point of the first semiconductor switch series circuit; a second semiconductor switch series circuit that is connected in parallel to the third capacitor and composed of at least six series-connected semiconductor switches each having an anti-parallel connected diode; a fourth capacitor that is connected in parallel to a series circuit of four semiconductor switches, two of which are in a one side of a middle point of the second semiconductor series circuit and two of which are in the other side of the middle point of the second semiconductor series circuit; a fifth capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching; wherein the control method delivers a predetermined switching pattern of semiconductor switches when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential.

A seventh aspect of the present invention is a control method for controlling a multilevel power conversion circuit for converting DC power to AC power or AC power to DC power, one phase portion of the power conversion circuit comprising: a first semiconductor switch series circuit that is connected between a positive terminal and a negative terminal of a DC power supply system having the positive terminal, the negative terminal, and a middle terminal, and composed of at least series-connected eight semiconductor switches each having an anti-parallel-connected diode; a first capacitor that is connected in parallel to a series circuit of two semiconductor switches connected to a middle point of the first semiconductor switch series circuit; a second capacitor that is connected in parallel to a series circuit of four semiconductor switches, two of which are in a one side of a middle point of the first semiconductor series circuit and two of which are in the other side of the middle point of the first semiconductor series circuit; a third capacitor that is connected in parallel to a series circuit of six semiconductor switches, three of which are in a one side of a middle point of the first semiconductor series circuit and other three of which are in the other side of the middle point of the first semiconductor switch series circuit; a second semiconductor switch series circuit that is connected in parallel to the third capacitor and composed of at least six series-connected semiconductor switches each having an anti-parallel connected diode; a fourth capacitor that is connected in parallel to a series circuit of four semiconductor switches, two of which are in a one side of a middle point of the second semiconductor switch series circuit and two of which are in the other side of the middle point of the second semiconductor series circuit; a fifth capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching; wherein the control method delivers a predetermined switching pattern of semiconductor switches corresponding to a voltage value across at least one of the first through fifth capacitors when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential.

An eighth aspect of the present invention is the control method for controlling a multilevel power conversion circuit according to the sixth or seventh aspect of the present invention, wherein a period of time for delivering the predetermined switching pattern is shorter than one carrier period of pulse width modulation control.

A ninth aspect of the present invention is the control method for controlling a multilevel power conversion circuit according to the sixth or seventh aspect of the present invention, wherein selection of switching pattern is determined corresponding to preliminarily detected voltage values across the first through fourth capacitors.

A tenth aspect of the present invention is the control method for controlling a multilevel power conversion circuit according to the ninth, wherein the selection of switching pattern is determined corresponding to the voltage value across the fifth capacitor in first preference.

In the process of transition of AC terminal voltage from zero to +Ed (or negative to positive) or from zero to −Ed (or positive to negative), a control method of some embodiments of the invention for controlling a multilevel power conversion circuit using flying capacitors detects voltage across the flying capacitors and, when the detected voltage is lower than a predetermined voltage, the control method delivers ON/OFF pulses in a pattern to charging the flying capacitors, and when the detected voltage is higher than the predetermined voltage, the control method delivers ON/OFF pulses in a pattern to discharging the flying capacitors during a period of time shorter than the carrier period for PWM control in preference to the normal ON/OFF signal pattern for the semiconductor switches. Thus, the control method of the invention does not require flying capacitors with large capacitance.

Therefore, a control method for a multilevel power conversion circuit that allows flying capacitors to have small capacitance values has been provided.

BRIEF DESCRIPTION OF THE DRAWINGS

FIG. 11 shows charging and discharging states of capacitors in the first through eighth embodiment examples;

FIG. 12 shows modes of selection of a forced interrupt pattern corresponding to capacitor voltages;

FIG. 13 shows embodiment examples for the transition from zero to Ed in the present invention;

DETAILED DESCRIPTION OF THE INVENTION

In the process of transition of AC terminal voltage from zero to +Ed (or negative to positive) or from zero to –Ed (or positive to negative), a control method of some embodiments of the invention for controlling a multilevel power conversion circuit using flying capacitors detects voltage across the flying capacitors and, when the detected voltage is lower than a predetermined voltage, the control method delivers ON/OFF pulses in a pattern to charge the flying capacitors, and when the detected voltage is higher than the predetermined voltage, the control method delivers ON/OFF pulses in a pattern to discharge the flying capacitors during a period of time shorter than the carrier period for PWM control in preference to the normal ON/OFF signal pattern for the semiconductor switches.

[First Embodiment]

Figure 1:
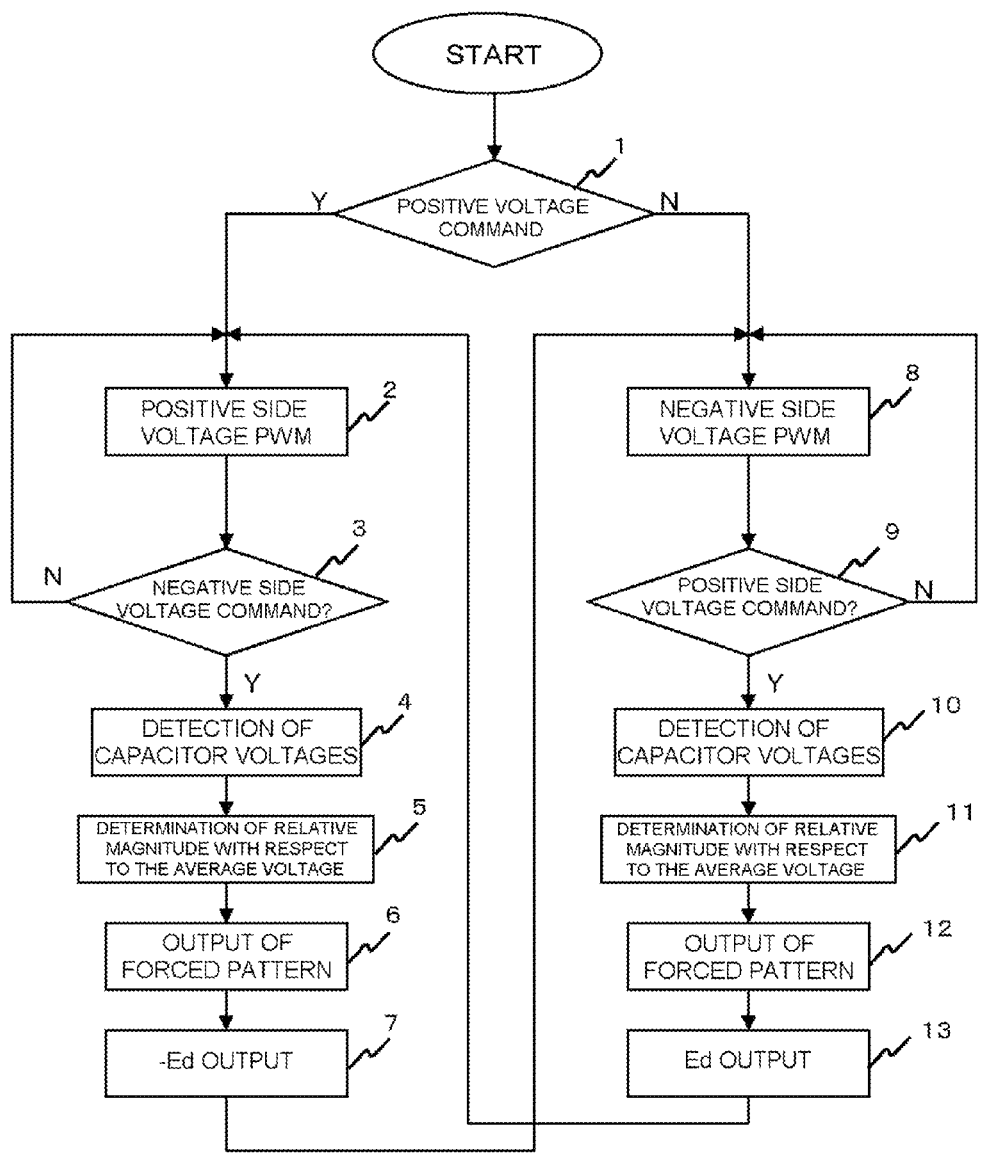
FIG. 1 is a first example of control flow chart showing a control algorithm in embodiments of the present invention.

FIG. 1 shows a First Embodiment of the present invention. FIG. 1 is an example of a control flowchart of a PWM control algorithm in the present invention. FIGS. 3A through 10D show eight types of operation patterns for transition from zero volts shown in FIG. 19 to –Ed voltage.

Referring to FIG. 1, the block 1 after start determines the polarity of the output voltage command. If it is positive, the block 2 performs PWM control of the positive side voltage to deliver one of the voltages 3Ed, 2Ed, Ed, and 0 (zero). Then, block 3 determines whether a negative voltage side command exists or not. If a negative side voltage command exists, the block 4 detects the voltage values across the flying capacitors C1a, C2, and C1b. Then, the block 5 compares the detected voltage value with the average voltage that is a preset value to determine relative magnitude. Corresponding to the comparison result, the block 6 delivers a predetermined ON/OFF pattern of semiconductor switches for a short period of time, followed by output of the voltage –Ed from the block 7. The "short period of time" is determined only taking the time period for commutation of the IGBT into account, and so is generally about 10 µs in total. The –Ed output by the block 7 is delivered according to the switching pattern (3) or (5) listed in paragraph [0010]. After that, the block 8 performs PWM control of negative side voltage to deliver one of the voltages –3Ed, –2Ed, –Ed, and 0. Subsequently, the blocks 10, 11, 12, and 13 performs each processing, and then the operation procedure returns to the PWM control of the positive side voltage. In the operation procedure, the blocks 4 through 7 operate in the switching pattern in which current flows through the capacitor C1a under the negative side voltage command; and the blocks 10 through 13 operate in the switching pattern in which current flows through the capacitor C1a under the positive side voltage command. The current flows for a time period of several micro-seconds.

Since the average value of the voltage across the capacitor C1a needs to be Ed, the output pattern is determined corresponding to the voltage value across the capacitor C1a.

In the process of transition from zero voltage to the voltage –Ed, the average voltage can be held at Ed by selecting a switching pattern from charging patterns of FIG. 3, FIG. 4, FIG. 6 and FIG. 8 when the voltage across the capacitor C1a is lower than Ed, and by selecting a switching pattern from the discharging pattern of FIG. 5, FIG. 7, FIG. 9 and FIG. 10 when the voltage across the capacitor C1a is higher than Ed.

FIGS. 3A through 10D show the operation in the switching pattern for making current flow toward the AC terminal or positive side using IGBTs for semiconductor switches. The operations of FIG. 3, which includes FIGS. 3A through 3D, through FIG. 10, which includes FIGS. 10A through 10D, are referred to as embodiment example 1a through embodiment example 8a, respectively. The operation of FIG. 3 or the embodiment example 1a is first described.

Figure 3A:
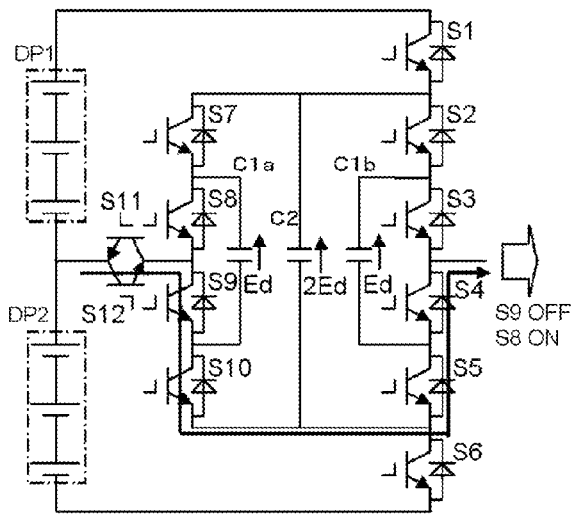
FIGS. 3A through 3D illustrate a first embodiment example of operation in the transition from zero to −Ed in embodiments of the present invention.
Figure 3B:
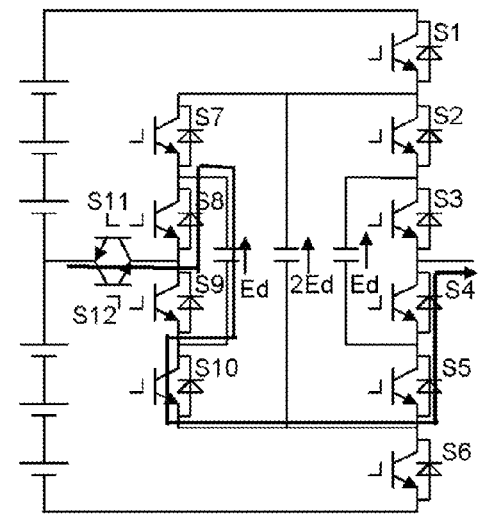
Figure 3D:
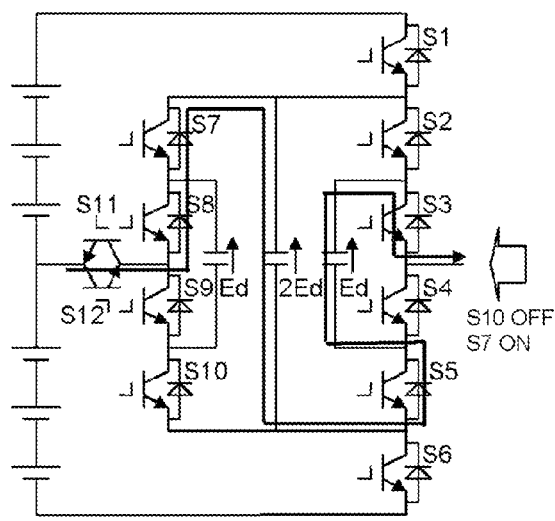
Figure 3C:
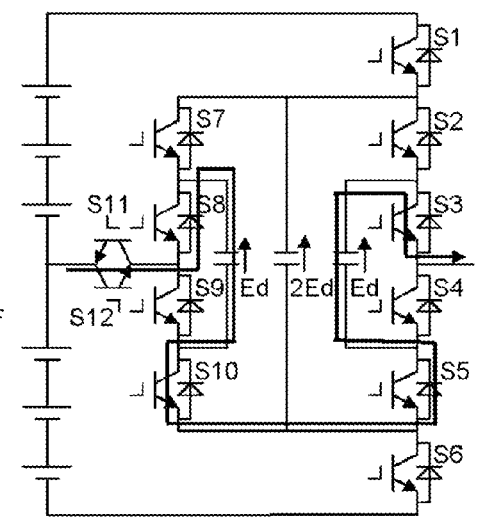
Figure 19:
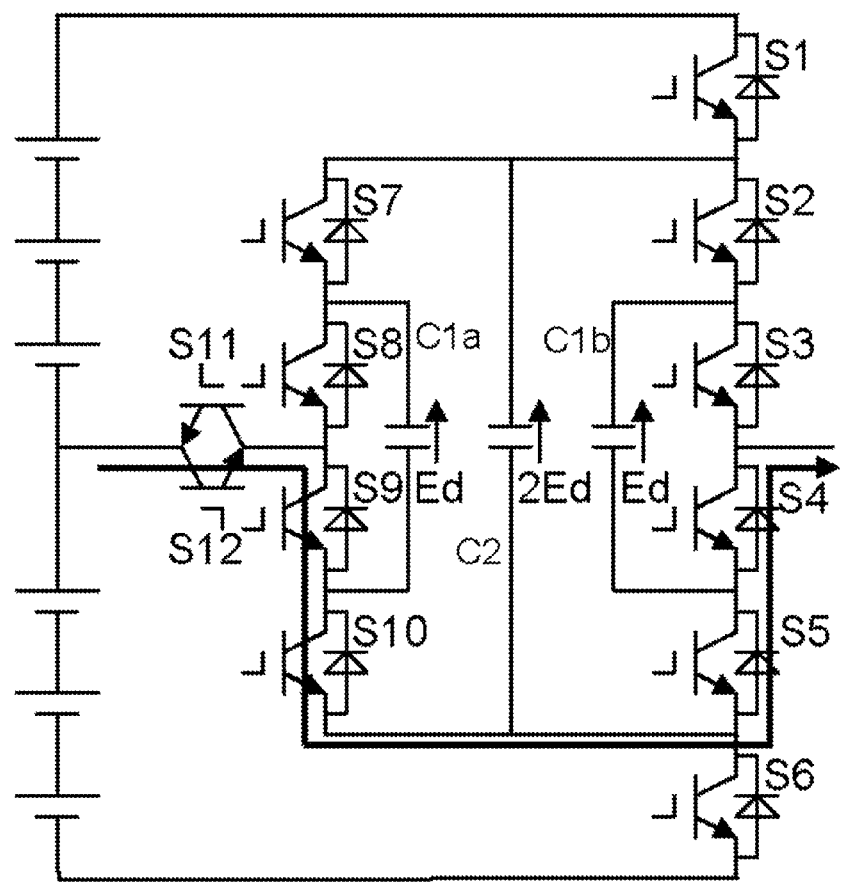
FIG. 19 shows an operation pattern delivering a zero voltage in transition from Ed to the zero potential.

From the state of FIG. 3A, which is a duplicate of FIG. 19, delivering zero volts, the IGBT S9 is turned OFF and the IGBT S8 is turned ON as shown in FIG. 3B, delivering a voltage –Ed at the AC terminal. In this process, the capacitor C1a is charged. Then, the IGBT S4 is turned OFF and the IGBT S3 is turned ON as shown in FIG. 3C delivering zero voltage at the AC terminal. In this switching pattern, the capacitor C1a is charged and the capacitor C1b is discharged. Then, the IGBT S10 is turned OFF and the IGBT S7 is turned ON as shown in FIG. 3D, which is a normal state, delivering a voltage –Ed at the AC terminal. In this process to change the AC terminal voltage from zero to –Ed, an operational switching pattern is provided in which the AC terminal voltage becomes at –Ed for a short period of time shorter than one period of the carrier. This operational switching pattern enables the capacitor C1a charged, the capacitor C2 charged, and the capacitor C1b discharged.

Figure 4A:
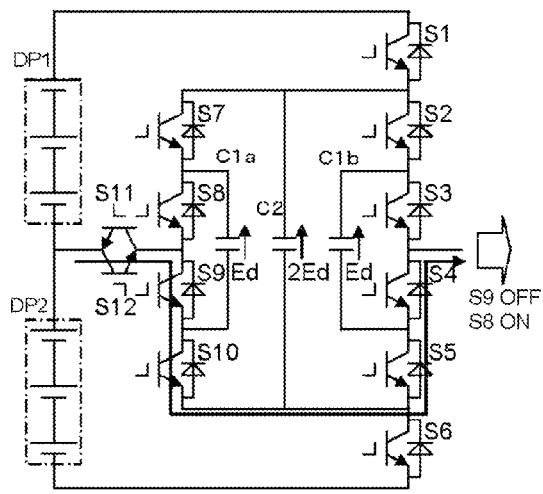
FIGS. 4A through 4D illustrate a second embodiment example of operation in the transition from zero to −Ed in embodiments of the present invention.
Figure 4B:
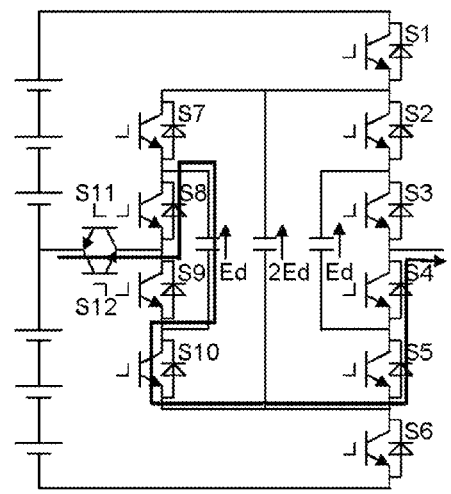
Figure 4D:
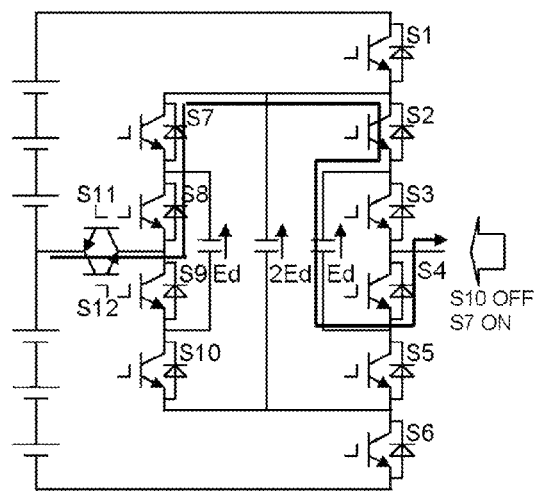
Figure 4C:
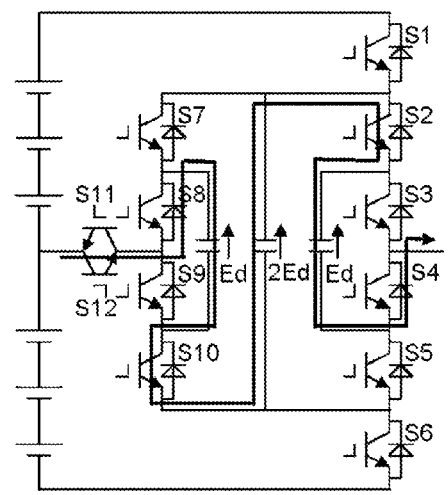

FIGS. 4A through 4D show the operational switching pattern of embodiment example 2a. From the state of FIG. 4A, which is a duplicate of FIG. 19, delivering zero volts, the IGBT S9 is turned OFF and the IGBT S8 is turned ON as shown in FIG. 4B, delivering a voltage –Ed at the AC terminal. In this process, the capacitor C1a is charged. Then, the IGBT S5 is turned OFF and the IGBT S2 is turned ON as shown in FIG. 4C delivering zero voltage at the AC terminal. In this switching pattern the capacitor C1a is charged, the capacitor C2 is discharged, and the capacitor C1b is charged. Then, the IGBT S10 is turned OFF and the IGBT S7 is turned ON as shown in FIG. 4D, which is a normal state, delivering a voltage –Ed at the AC terminal. In this process to change the AC terminal voltage from zero to –Ed, an operational switching pattern is provided in which the AC terminal voltage becomes at –Ed for a short period of time shorter than one period of the carrier. This operational switching pattern enables the capacitor C1a charged, the capacitor C2 discharged, and the capacitor C1b charged.

Figure 5A:
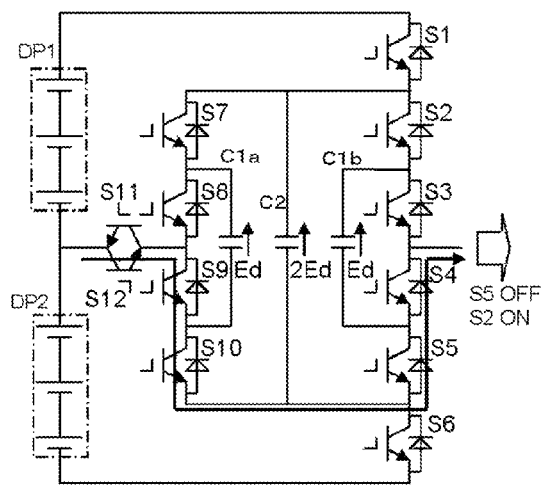
FIGS. 5A through 5D illustrate a third embodiment example of operation in the transition from zero to −Ed in embodiments of the present invention.
Figure 5B:
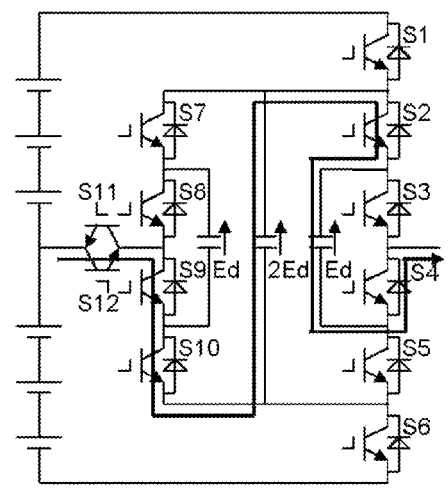
Figure 5D:
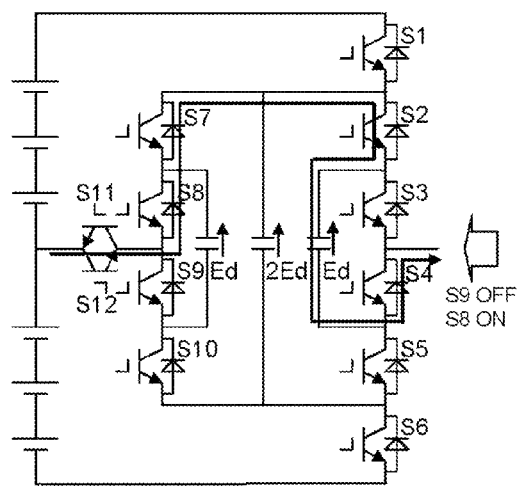
Figure 5C:
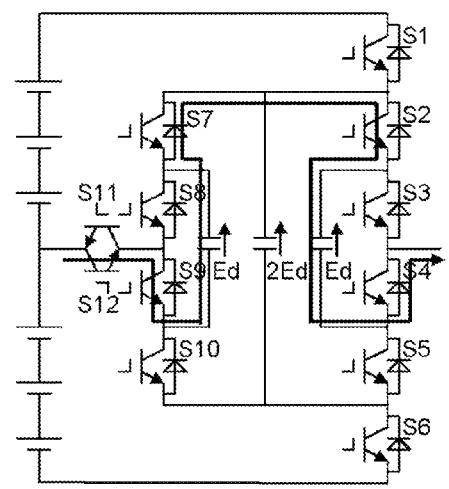

FIGS. 5A through 5D show the operational switching pattern of embodiment example 3a. From the state of FIG. 5A, which is a duplicate of FIG. 19, delivering zero volts, the IGBT S5 is turned OFF and the IGBT S2 is turned ON as shown in FIG. 5B, delivering a voltage −Ed at the AC terminal. In this process, the capacitor C2 is discharged and the capacitor C1b is charged. Then, the IGBT S10 is turned OFF and the IGBT S7 is turned ON as shown in FIG. 5C delivering zero voltage at the AC terminal. In this switching pattern the capacitor C1a is discharged and the capacitor C1b is charged. Then, the IGBT S9 is turned OFF and the IGBT S8 is turned ON as shown in FIG. 5D, which is a normal state, delivering a voltage −Ed at the AC terminal. In this process to change the AC terminal voltage from zero to −Ed, an operational switching pattern is provided in which the AC terminal voltage becomes at −Ed for a short period of time shorter than one period of the carrier. This operational switching pattern enables the capacitor C1a discharged, the capacitor C2 discharged, and the capacitor C1b charged.

Figure 6A:
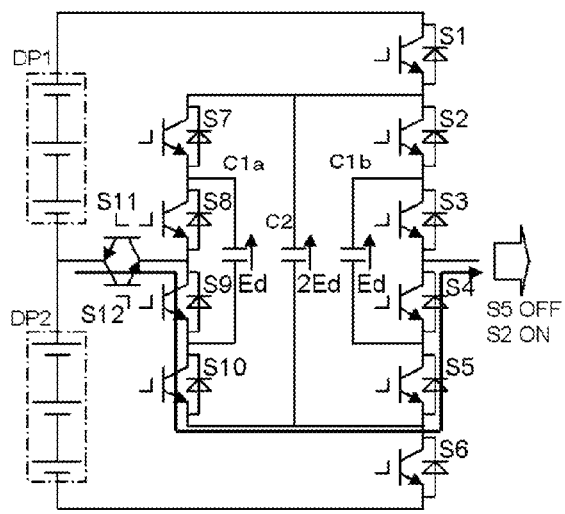
FIGS. 6A through 6D illustrate a fourth embodiment example of operation in the transition from zero to −Ed in embodiments of the present invention.
Figure 6B:
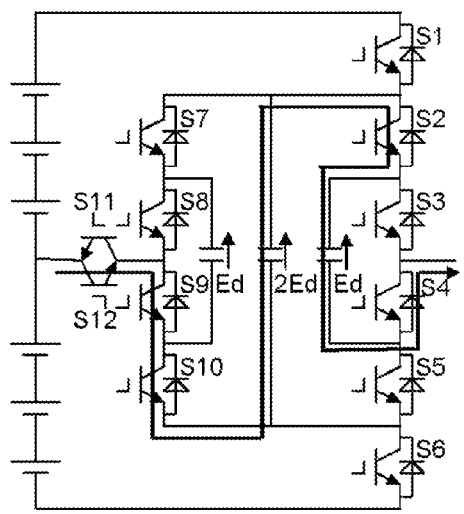
Figure 6D:
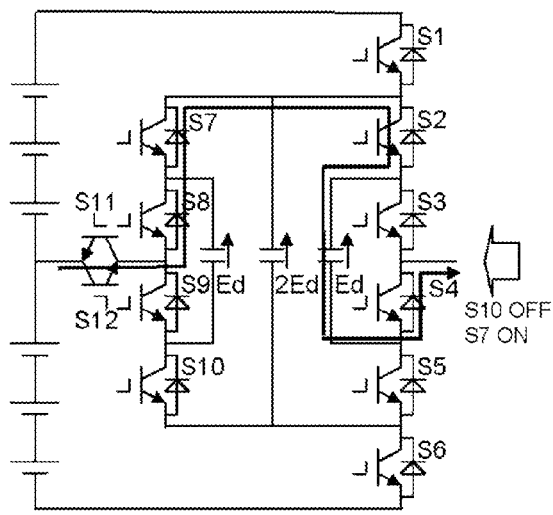
Figure 6C:
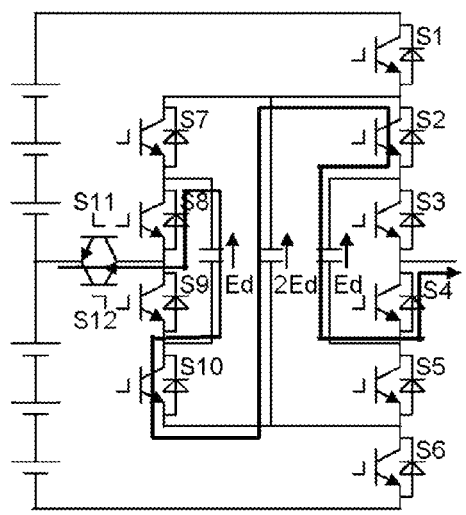

FIGS. 6A through 6D shows the operational switching pattern of embodiment example 4a. From the state of FIG. 6A, which is a duplicate of FIG. 19, delivering zero volts, the IGBT S5 is turned OFF and the IGBT S2 is turned ON as shown in FIG. 6B, delivering a voltage −Ed at the AC terminal. In this process, the capacitor C2 is discharged and the capacitor C1b is charged. Then, the IGBT S9 is turned OFF and the IGBT S8 is turned ON as shown in FIG. 6C delivering zero voltage at the AC terminal. In this switching pattern the capacitor C1a is charged, the capacitor C2 is discharged, and the capacitor C1b is charged. Then, the IGBT S10 is turned OFF and the IGBT S7 is turned ON as shown in FIG. 6D, which is a normal state, delivering a voltage −Ed at the AC terminal. In this process to change the AC terminal voltage from zero to −Ed, an operational switching pattern is provided in which the AC terminal voltage becomes at −Ed for a short period of time shorter than one period of the carrier. This operational switching pattern enables the capacitor C1a charged, the capacitor C2 discharged, and the capacitor C1b charged.

Figure 7A:
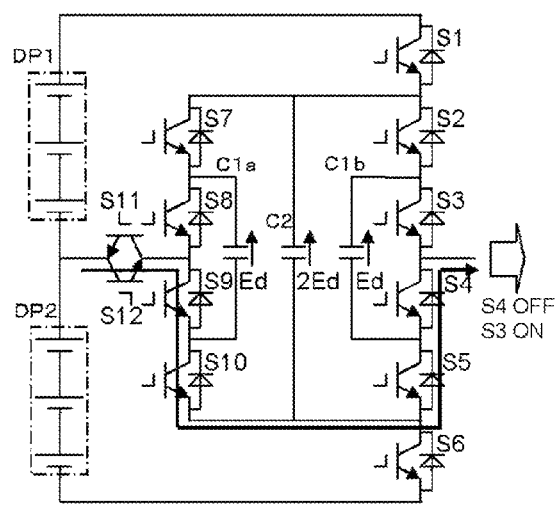
FIGS. 7A through 7D illustrate a fifth embodiment example of operation in the transition from zero to −Ed in embodiments of the present invention.
Figure 7B:
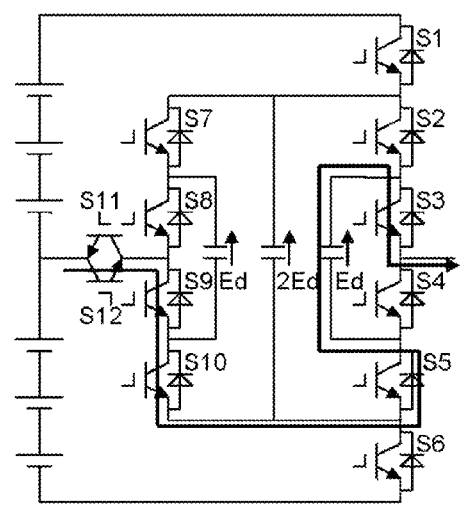
Figure 7D:
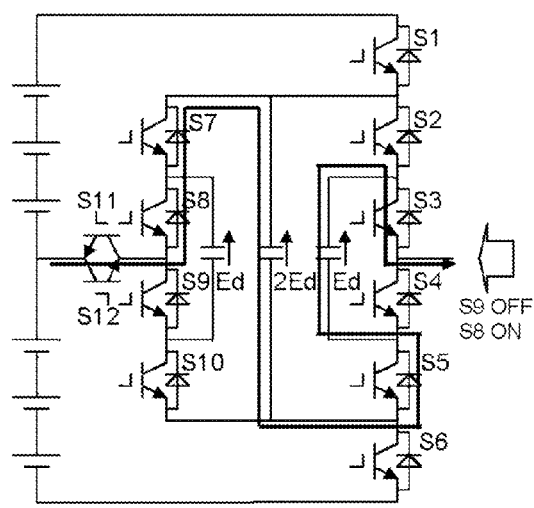
Figure 7C:
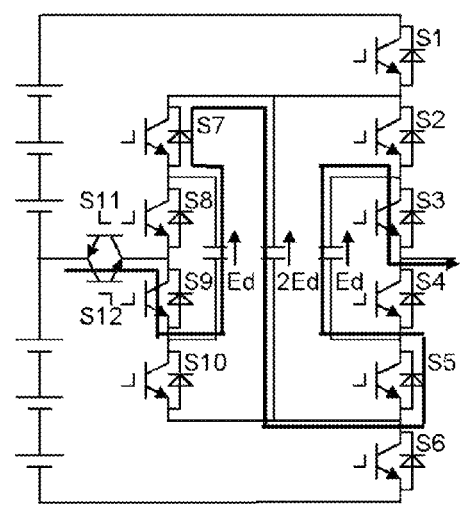

FIGS. 7A through 7D show the operational switching pattern of embodiment example 5a. From the state of FIG. 7A, which is a duplicate of FIG. 19, delivering zero volts, the IGBT S4 is turned OFF and the IGBT S3 is turned ON as shown in FIG. 7B, delivering a voltage −Ed at the AC terminal. In this process, the capacitor C1b is discharged. Then, the IGBT S10 is turned OFF and the IGBT S7 is turned ON as shown in FIG. 7C delivering zero voltage at the AC terminal. In this switching pattern the capacitor C1a is discharged, the capacitor C2 is charged, and the capacitor C1b is discharged. Then, the IGBT S9 is turned OFF and the IGBT S8 is turned ON as shown in FIG. 7D, which is a normal state, delivering a voltage −Ed at the AC terminal. In this process to change the AC terminal voltage from zero to −Ed, an operational switching pattern is provided in which the AC terminal voltage becomes at −Ed for a short period of time shorter than one period of the carrier. This operational switching pattern enables the capacitor C1a discharged, the capacitor C2 charged, and the capacitor C1b discharged.

Figure 8A:
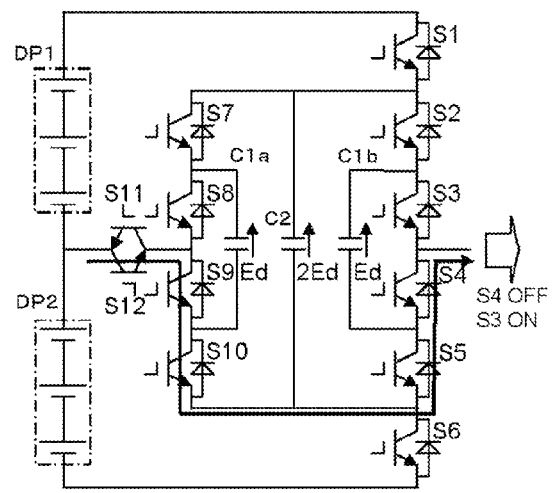
FIGS. 8A through 8D illustrate a sixth embodiment example of operation in the transition from zero to −Ed in embodiments of the present invention.
Figure 8B:
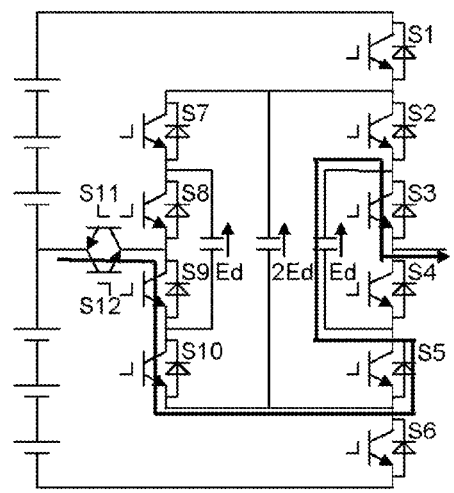
Figure 8D:
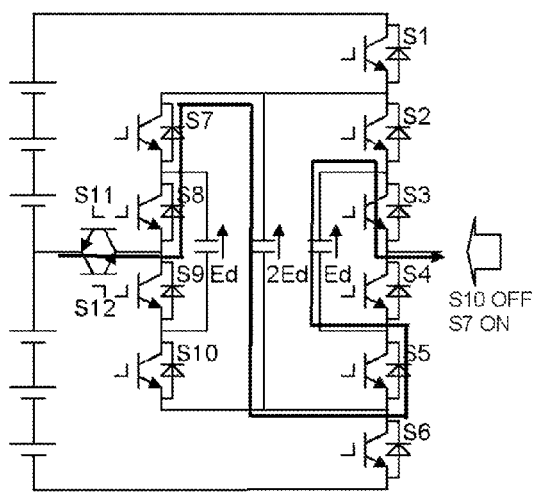
Figure 8C:
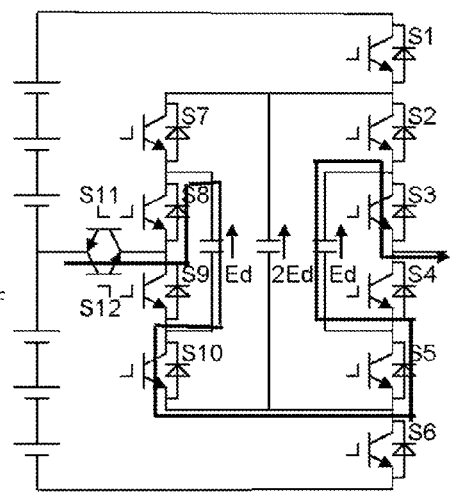

FIGS. 8A through 8D show the operational switching pattern of embodiment example 6a. From the state of FIG. 8A, which is a duplicate of FIG. 19, delivering zero volts, the IGBT S4 is turned OFF and the IGBT S3 is turned ON as shown in FIG. 8B, delivering a voltage −Ed at the AC terminal. In this process, the capacitor C1b is discharged. Then, the IGBT S9 is turned OFF and the IGBT S8 is turned ON as shown in FIG. 8C delivering zero voltage at the AC terminal. In this switching pattern the capacitor C1a is charged and the capacitor C1b is discharged. Then, the IGBT S10 is turned OFF and the IGBT S7 is turned ON as shown in FIG. 8D, which is a normal state, delivering a voltage −Ed at the AC terminal. In this process to change the AC terminal voltage from zero to −Ed, an operational switching pattern is provided in which the AC terminal voltage becomes at −Ed for a short period of time shorter than one period of the carrier. This operational switching pattern enables the capacitor C1a charged, the capacitor C2 charged, and the capacitor C1b discharged.

Figure 9A:
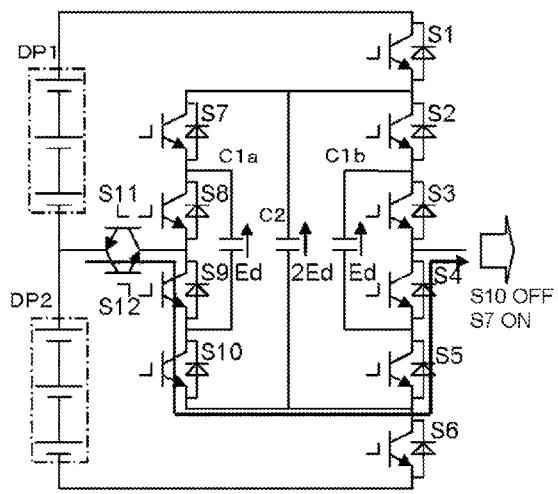
FIGS. 9A through 9D illustrate a seventh embodiment example of operation in the transition from zero to −Ed in embodiments of the present invention.
Figure 9B:
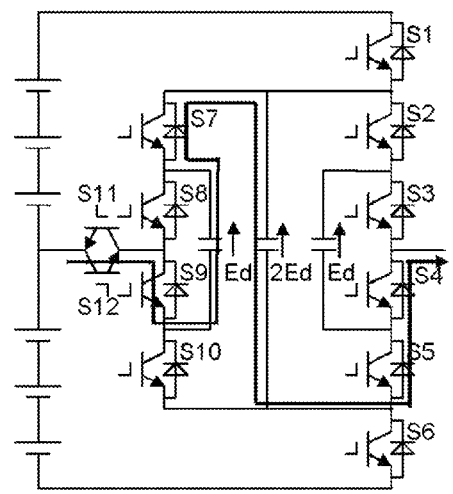
Figure 9D:
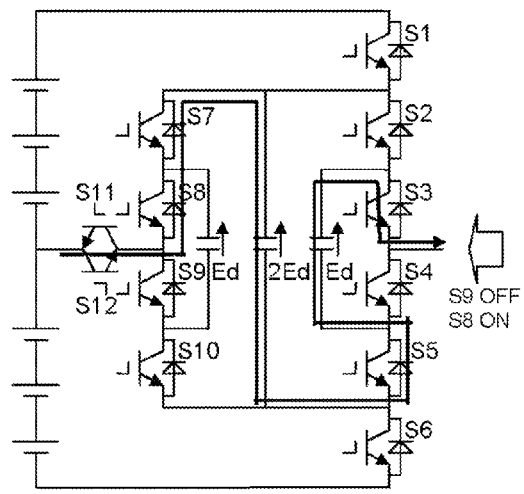
Figure 9C:
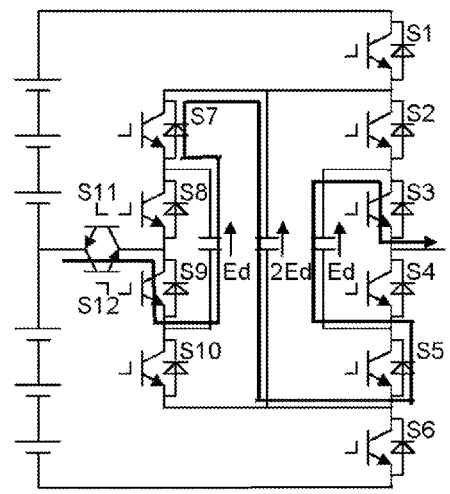

FIGS. 9A through 9D show the operational switching pattern of embodiment example 7a. From the state of FIG. 9A, which is a duplicate of FIG. 19, delivering zero volts, the IGBT S10 is turned OFF and the IGBT S7 is turned ON as shown in FIG. 9B, delivering a voltage −Ed at the AC terminal. In this process, the capacitor C1a is discharged and the capacitor C2 is charged. Then, the IGBT S4 is turned OFF and the IGBT S3 is turned ON as shown in FIG. 9C delivering zero voltage at the AC terminal. In this switching pattern the capacitor C1a is discharged, the capacitor C2 is charged, and the capacitor C1b is discharged. Then, the IGBT S9 is turned OFF and the IGBT S8 is turned ON as shown in FIG. 9D, which is a normal state, delivering a voltage −Ed at the AC terminal. In this process to change the AC terminal voltage from zero to −Ed, an operational switching pattern is provided in which the AC terminal voltage becomes at −Ed for a short period of time shorter than one period of the carrier. This operational switching pattern enables the capacitor C1a discharged, the capacitor C2 charged, and the capacitor C1b discharged.

Figure 10A:
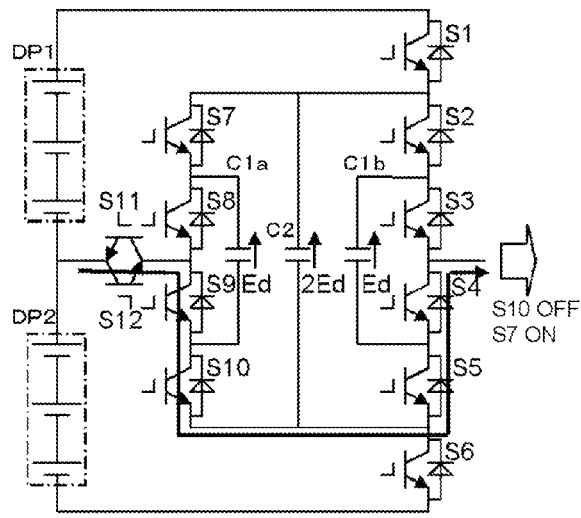
FIGS. 10A through 10D illustrate a eighth embodiment example of operation in the transition from zero to −Ed in embodiments of the present invention.
Figure 10B:
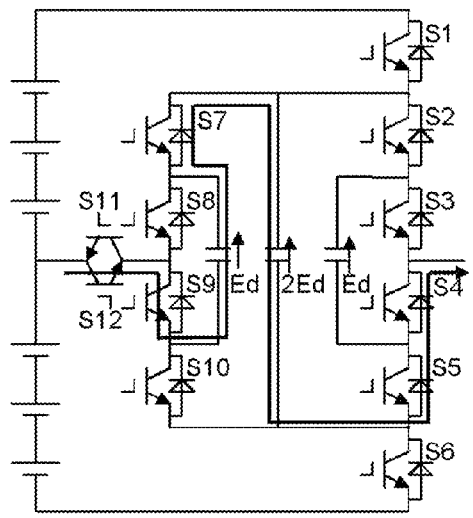
Figure 10D:
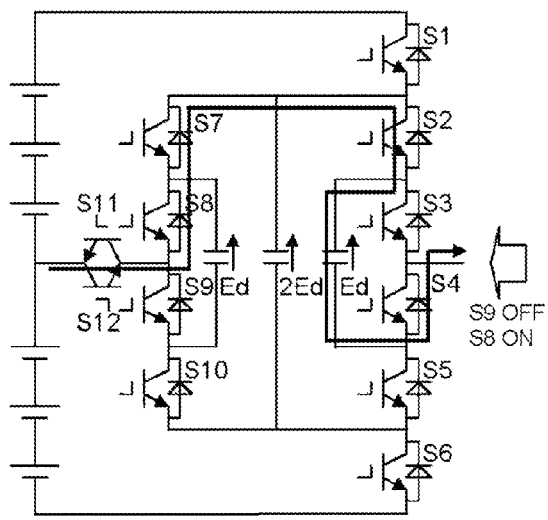
Figure 10C:
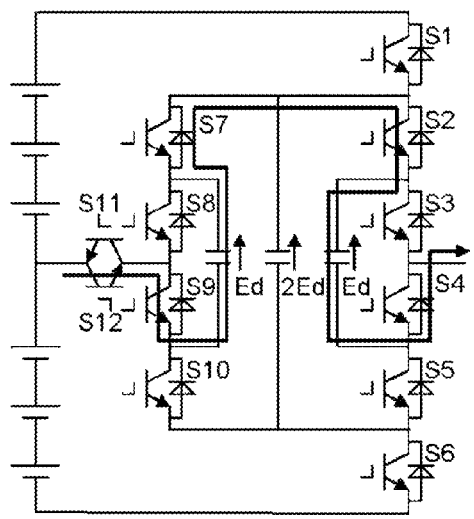

FIGS. 10A through 10D show the operational switching pattern of embodiment example 8a. From the state of FIG. 10A, which is a duplicate of FIG. 19, delivering zero volts, the IGBT S10 is turned OFF and the IGBT S7 is turned ON as shown in FIG. 10B, delivering a voltage −Ed at the AC terminal. In this process, the capacitor C1a is discharged and the capacitor C2 is charged. Then, the IGBT S5 is turned OFF and the IGBT S2 is turned ON as shown in FIG. 10C delivering zero voltage at the AC terminal. In this switching pattern the capacitor C1a is discharged and the capacitor C1b is charged. Then, the IGBT S9 is turned OFF and the IGBT S8 is turned ON as shown in FIG. 10D, which is a normal state, delivering a voltage −Ed at the AC terminal. In this process to change the AC terminal voltage from zero to −Ed, an operational switching pattern is provided in which the AC terminal voltage becomes at −Ed for a short period of time shorter than one period of the carrier. This operational switching pattern enables the capacitor C1a discharged, the capacitor C2 charged, and the capacitor C1b charged.

FIG. 11 shows the states of "charging" or "discharging" of the capacitors C1a, C2, and C1b in the operational patterns of the embodiment example 1a through the embodiment example 8a. The "charge" and "discharge" in italic, bold type indicate operation that delivers forced operation patterns. FIG. 12 shows the ways of selecting the forced operation patterns. After detecting the voltages of the capacitors C1a, C2, and C1b, such an operational pattern is selected as a forced operation pattern that contains a charging mode when the detected voltage is lower than a predetermined value, and such an operational pattern is selected as a forced operation pattern that contains a discharging mode when the detected voltage is larger than the predetermined value. This way of selection prevents the capacitors from over-charging and over-discharging. The above description is made for the case the current flows out of the AC terminal. In the modes a current flows in from the AC terminal in spite of output of a certain voltage at the AC terminal, the "charge" and "discharge" of the capacitors are reversed.

Next, description will be made for a control method for transition from zero voltage state of FIG. 20 to a state of the voltage of +Ed in the following. This is the case the block 1 in FIG. 1 determines after start, the output voltage command as negative. The block 8 performs negative side voltage PWM to deliver one of the voltages −3Ed, −2Ed, −Ed, and 0. Then block 9 determines existence of a positive side voltage command. If a positive side voltage command exists, the block 10 detects voltage values of the flying capacitors C1a, C2, and C11b. The block 11 compares the detected voltage value with the average value, which is a preset value, to determine the relative magnitude. According to the comparison result, the block 12 delivers a predetermined pattern for a short period of time and the block 13 delivers the voltage Ed. The short period of time is generally about 10 μs in total because solely the commutation time of the IGBTs needs to be taken into account. After that, the block 2 performs PWM control of positive side voltage to deliver one of the voltages 3Ed, 2Ed, Ed, and 0. Then, the blocks 4, 5, and 6 perform each processing and transition to the PWM control of negative side voltage takes place.

Figure 20:
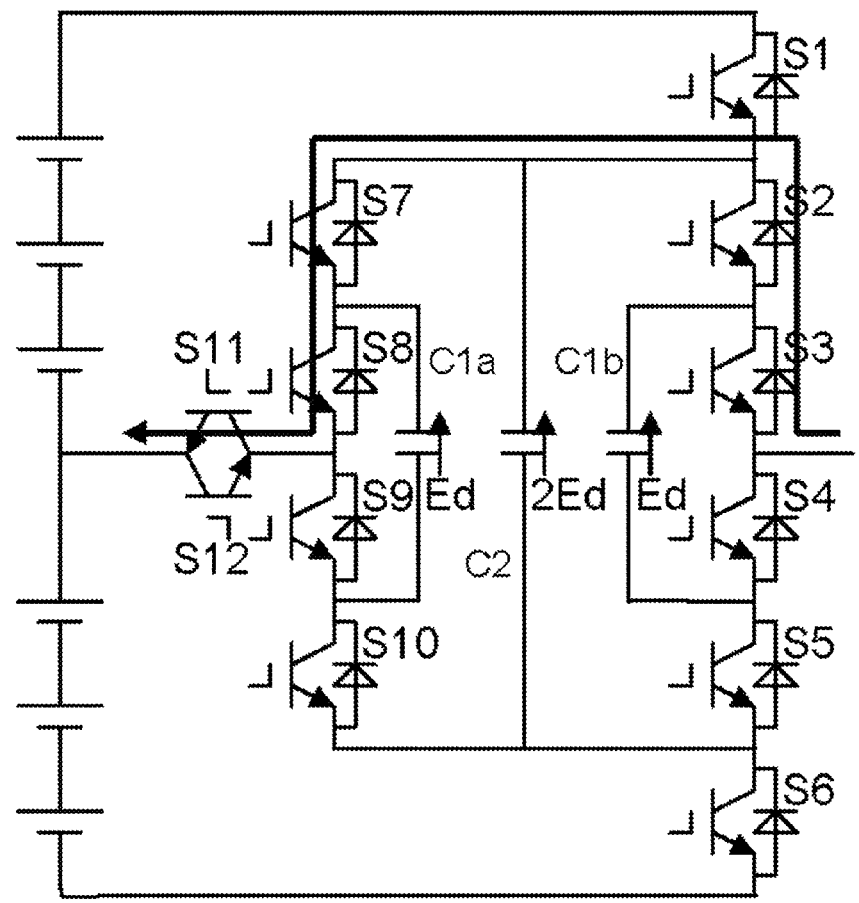
FIG. 20 shows an operation pattern delivering a zero voltage in transition from –Ed to the zero potential.
Figure 21:
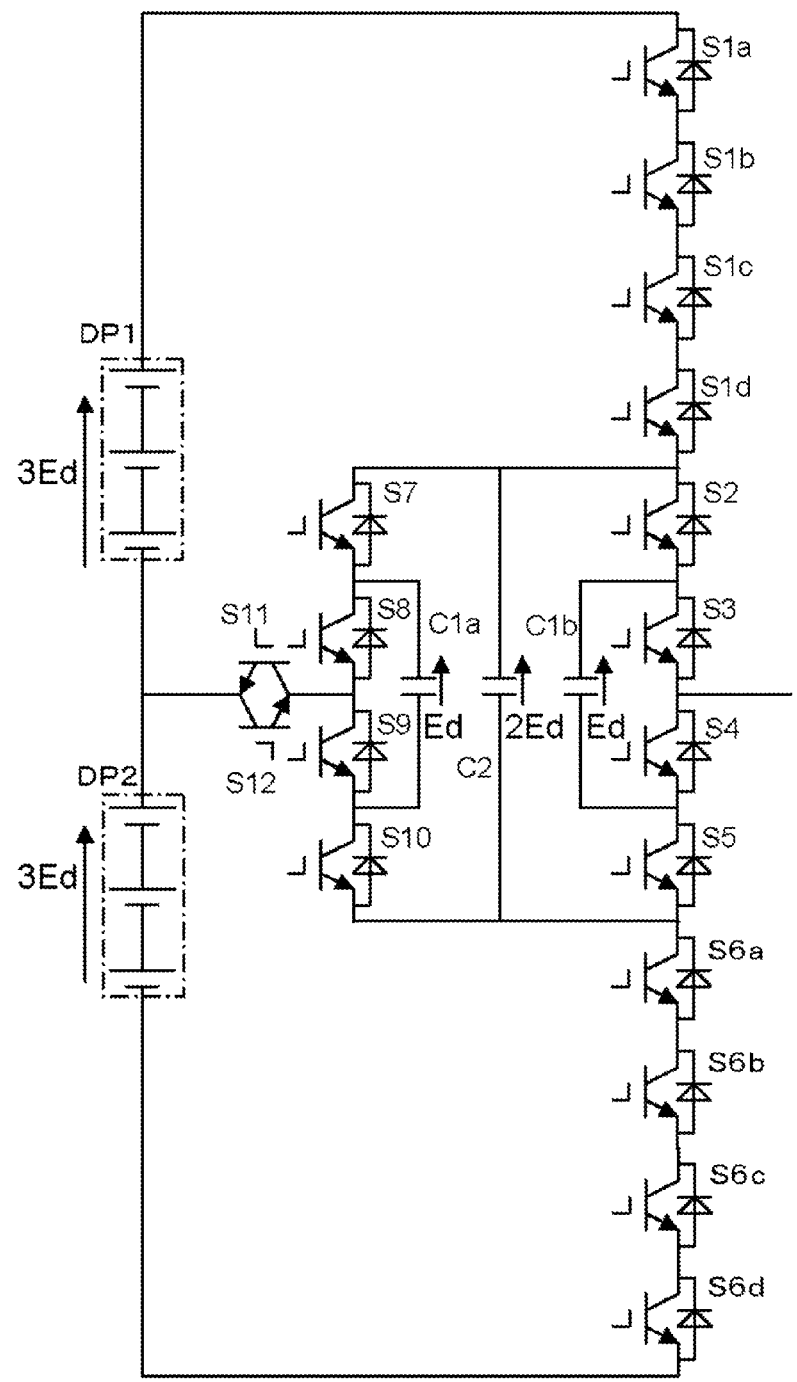
FIG. 21 is a circuit diagram of a seven-level power conversion circuit using semiconductor switches with the same withstand voltage.

FIG. 13 shows eight types of operation patterns: embodiment examples 1b through 8b that perform transition from the state of zero voltage as shown in FIG. 20 to a state of the voltage Ed. Every embodiment example operates through transition of switching patterns in the sequence of pattern (a)→pattern (b)→pattern (c)→pattern (d), and produces and delivers such an operation pattern that outputs an AC terminal voltage of Ed for a short period of time or an operation pattern that outputs an AC terminal voltage of −Ed for a short period of time like a transition of AC voltage: 0→Ed→0→Ed or 0→−Ed→0→Ed. These operation patterns enable the capacitors charged and discharged. Selecting way of forced operation pattern is similar to the case of transition from zero voltage to the voltage of −Ed and so the description thereon is omitted.

[Second Embodiment]

Figure 2:
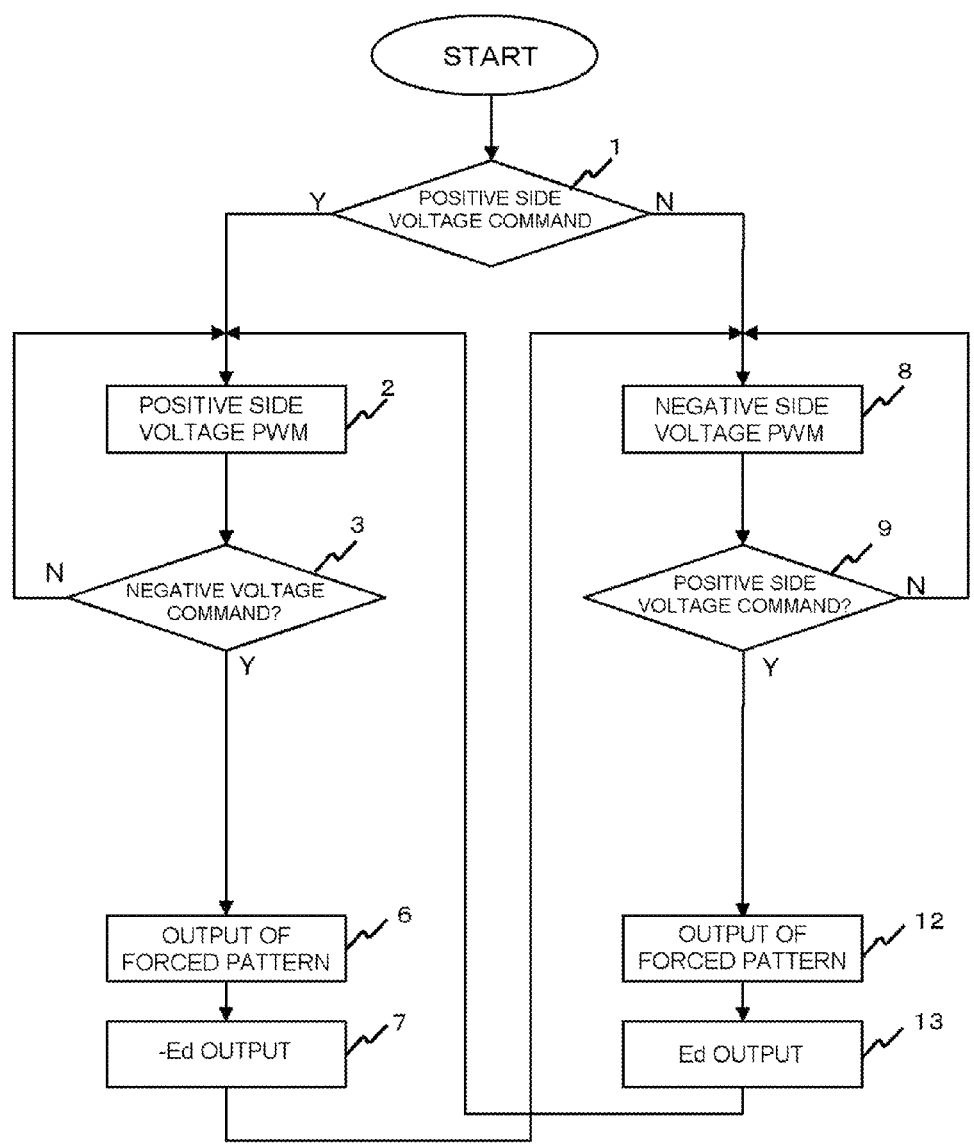
FIG. 2 is a second example of control flow chart showing a control algorithm in embodiments of the present invention.

FIG. 2 shows a Second Embodiment of the present invention. In the Second Embodiment of FIG. 2, removed from the First Embodiment are: the blocks 4 and 10 for detecting capacitor voltages and the blocks 5 and 11 for determining the relative magnitude of the detected voltage with respect to the average voltage. Referring to FIG. 2, the block 1 after start determines the polarity of the output voltage command. If it is positive, the block 2 performs PWM control of the positive side voltage to deliver one of the voltages 3Ed, 2Ed, Ed, and 0 (zero). Then, block 3 determines whether a negative side voltage command exists or not. If a negative side voltage command exists, the block 6 delivers a predetermined ON/OFF pattern of semiconductor switches for a short period of time, followed by output of the voltage −Ed from the block 7. The "short period of time" is determined only taking the time period for commutation of the IGBT into account, and so is generally about 10 μs in total. The −Ed output by the block 7 is delivered according to the switching pattern (3) or (5) listed in paragraph [0010]. After that, the block 8 performs PWM control of negative side voltage to deliver one of the voltages −3Ed, −2Ed, −Ed, and 0. Subsequently, the blocks 12 and 13 perform each processing, and then the operation procedure returns to the PWM control of the positive voltage.

This Second Embodiment can be applied to the cases in which voltage change of the capacitors is known corresponding to control conditions, or a case of smooth transition of AC voltage from 0 to −Ed (or positive to negative) or from 0 to Ed (or negative to positive). The control method of the Second Embodiment does not detect capacitor voltages and delivers forced operation patterns of predetermined operation patterns.

Figure 14:
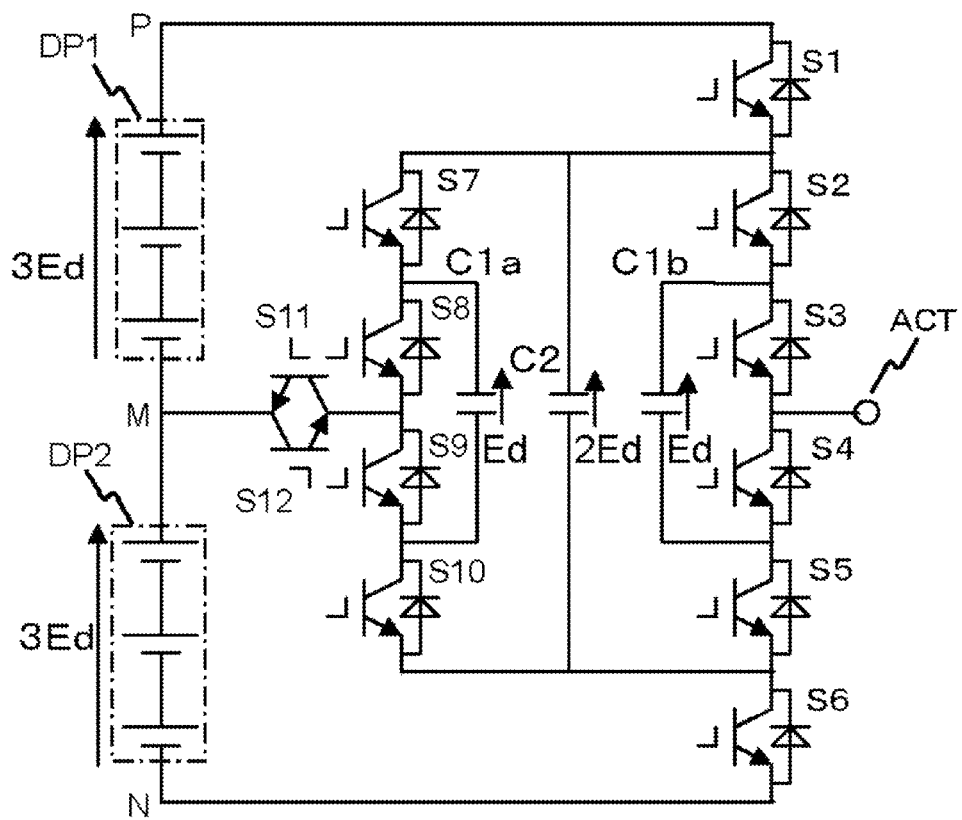
FIG. 14 shows an example of multilevel power conversion circuit to which the present invention applies.
Figure 15A:
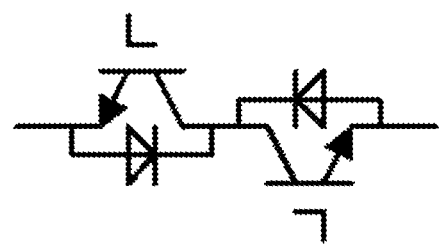
FIGS. 15A, 15B, and 15C show examples of construction of a bidirectional switch.
Figure 15B:
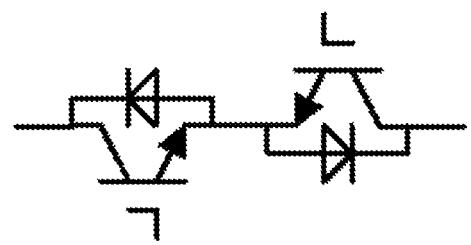
Figure 15C:
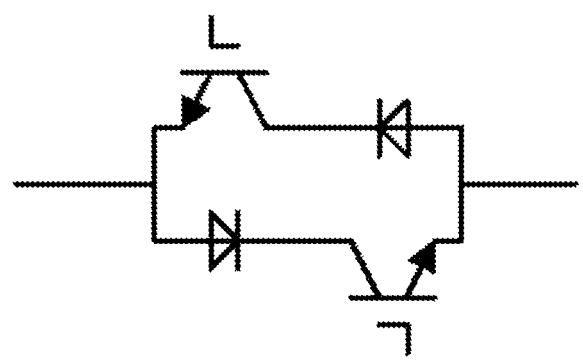
Figure 16:
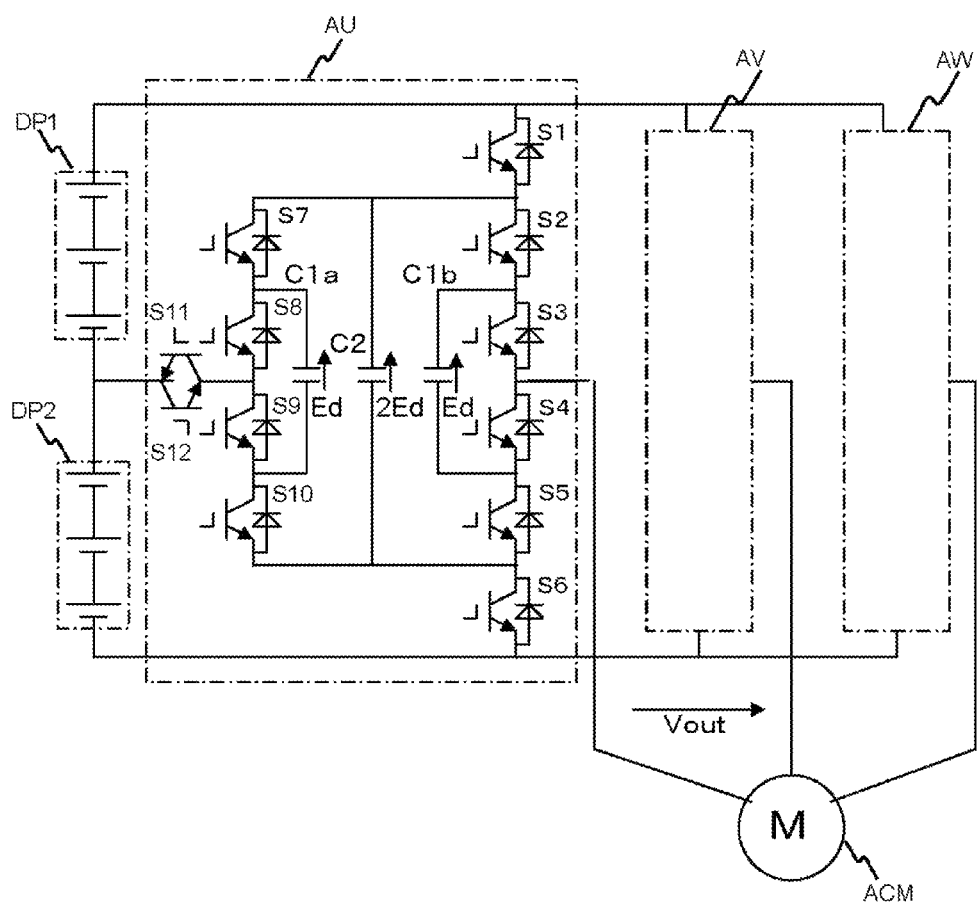
FIG. 16 shows an example of three phase power converter using a multilevel power conversion circuit.
Figure 17:
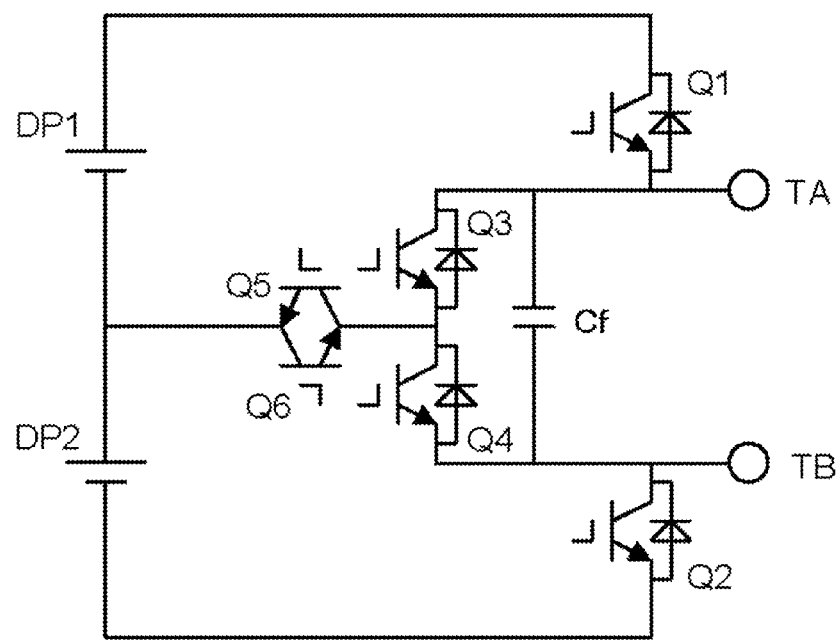
FIG. 17 is a circuit diagram of the basic part of a multilevel power conversion circuit.
Figure 18:
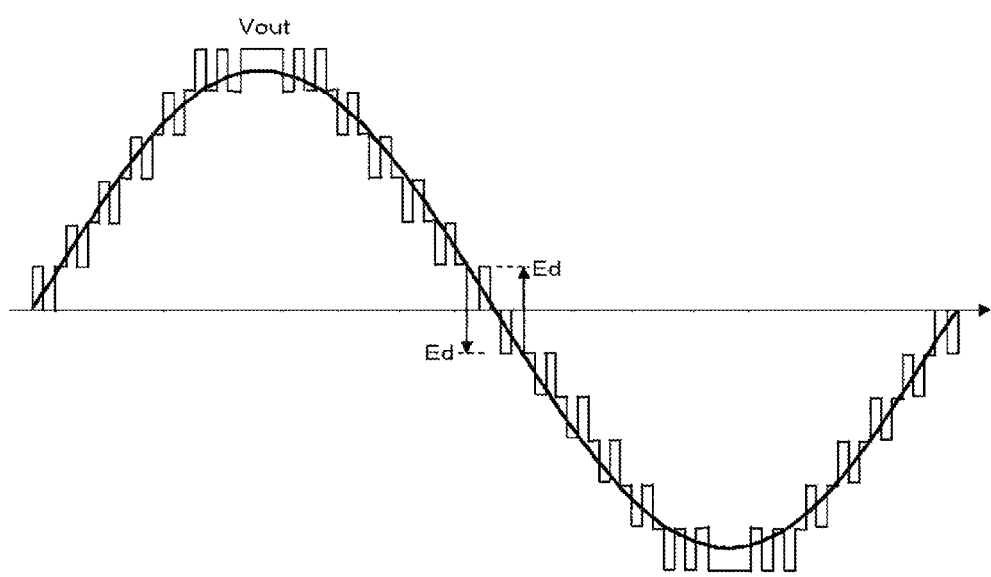
FIG. 18 shows an example of AC voltage waveform of a multilevel power conversion circuit.
Figure 22:
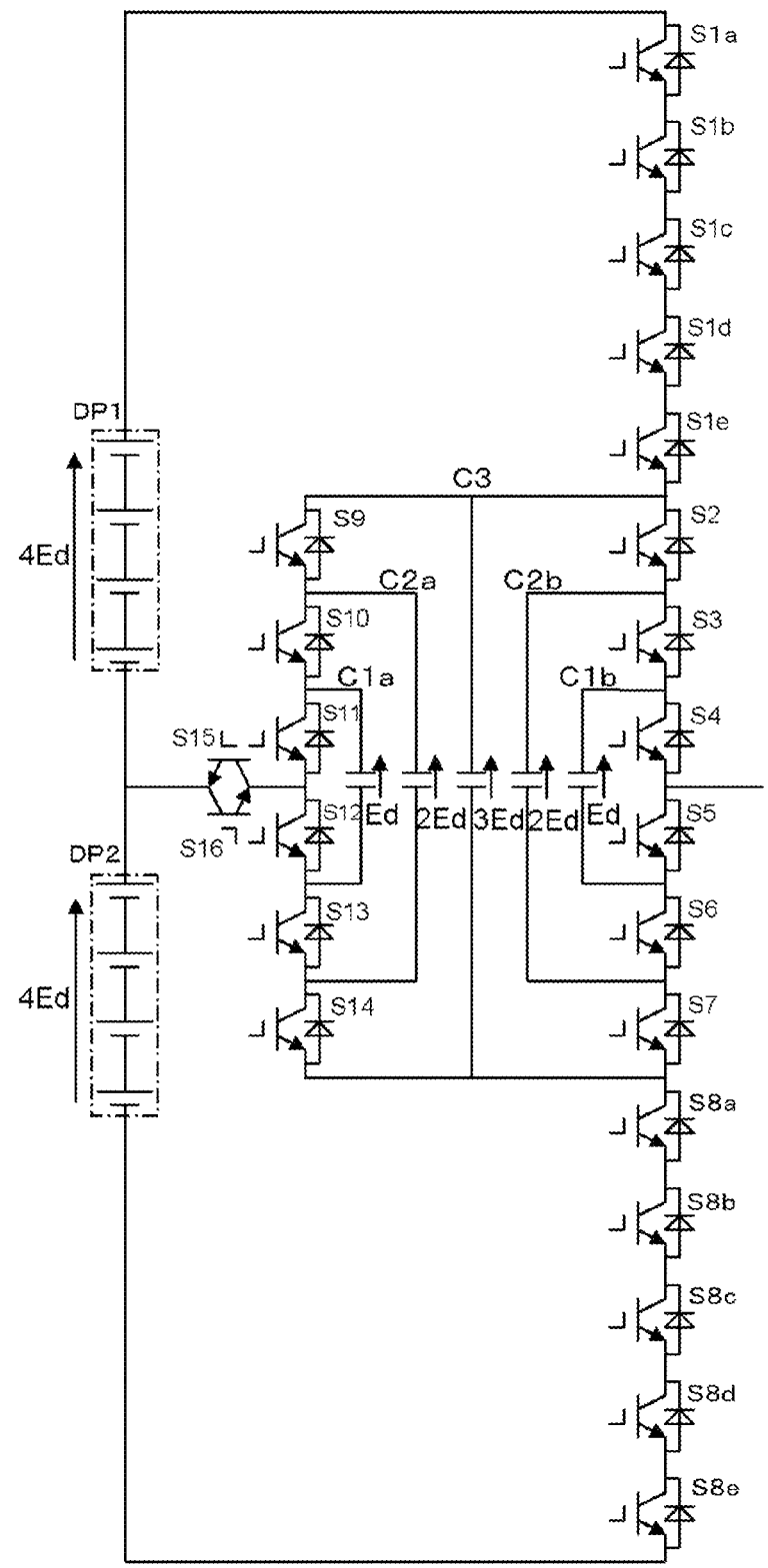
FIG. 22 is a circuit diagram of a nine-level power conversion circuit using semiconductor switches with the same withstand voltage.

The principle of the control method according to the present invention can be applied to multilevel conversion circuits, using flying capacitors, of nine or more levels of conversion circuit. FIG. 22 shows an example of nine-level conversion circuit which is provided with additional IGBTs and capacitors C2a and C2b to the seven-level conversion circuit shown in FIG. 14. The capacitors C1a and C2a in the conversion circuits can be small sized when applying the present invention.

The present invention can be applied to power conversion equipment using flying capacitors with high voltage output for motor driving and power conversion equipment for grid-connection.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-153204, filed on Jul. 9, 2012, contents of which are incorporated herein by reference.

What is claimed is:

1. A control method for controlling a multilevel power conversion circuit for converting DC power to AC power or AC power to DC power, one phase portion of the power conversion circuit including:
   a first semiconductor switch series circuit that is connected between a positive terminal and a negative terminal of a DC power supply system having the positive terminal, the negative terminal, and a middle terminal, and composed of at least series-connected six semiconductor switches each having an anti-parallel-connected diode;
   a first capacitor that is connected in parallel to a series circuit of two semiconductor switches connected to a middle point of the first semiconductor switch series circuit;
   a second capacitor that is connected in parallel to a series circuit of four semiconductor switches, two of which are in a one side of a middle point of the first semiconductor switch series circuit and two of which are in the other side of the middle point of the first semiconductor switch series circuit;
   a second semiconductor switch series circuit that is connected in parallel to the second capacitor and composed of at least series-connected four semiconductor switches each having an anti-parallel connected diode;
   a third capacitor that is connected in parallel to a series circuit of two semiconductor switches each connected to a middle point of the second semiconductor switch series circuit; and
   a bidirectional switch that is connected between the middle point of the second semiconductor switch series circuit and the middle terminal of the DC power supply system and is capable of bidirectional switching, the method comprising:

delivering a predetermined switching pattern of semiconductor switches when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential, wherein a period of time for delivering the predetermined switching pattern is shorter than one carrier period of pulse width modulation control.

2. A control method for controlling a multilevel power conversion circuit for converting DC power to AC power or AC power to DC power, one phase portion of the power conversion circuit including:

a first semiconductor switch series circuit that is connected between a positive terminal and a negative terminal of a DC power supply system having the positive terminal, the negative terminal, and a middle terminal, and composed of at least series-connected six semiconductor switches each having an anti-parallel-connected diode;

a first capacitor that is connected in parallel to a series circuit of two semiconductor switches connected to a middle point of the first semiconductor switch series circuit;

a second capacitor that is connected in parallel to a series circuit of four semiconductor switches, two of which are in a one side of a middle point of the first semiconductor switch series circuit and two of which are in the other side of the middle point of the first semiconductor switch series circuit;

a second semiconductor switch series circuit that is connected in parallel to the second capacitor and composed of at least series-connected four semiconductor switches each having an anti-parallel connected diode;

a third capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching, the method comprising:

delivering a predetermined switching pattern of semiconductor switches corresponding to a voltage value across at least one of the first, second, and third capacitors when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential.

3. A control method for controlling a multilevel power conversion circuit for converting DC power to AC power or AC power to DC power, one phase portion of the power conversion circuit including:

a first semiconductor switch series circuit that is connected between a positive terminal and a negative terminal of a DC power supply system having the positive terminal, the negative terminal, and a middle terminal, and composed of at least series-connected six semiconductor switches each having an anti-parallel-connected diode;

a first capacitor that is connected in parallel to a series circuit of two semiconductor switches connected to a middle point of the first semiconductor switch series circuit;

a second capacitor that is connected in parallel to a series circuit of four semiconductor switches, two of which are in a one side of a middle point of the first semiconductor switch series circuit and two of which are in the other side of the middle point of the first semiconductor switch series circuit;

a second semiconductor switch series circuit that is connected in parallel to the second capacitor and composed of at least series-connected four semiconductor switches each having an anti-parallel connected diode;

a third capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching, the method comprising:

delivering a predetermined switching pattern of semiconductor switches when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential, wherein selection of switching pattern is determined corresponding to preliminarily detected voltage values across the first, second, and third capacitors.

4. The control method for controlling a multilevel power conversion circuit according to claim 3, wherein the selection of switching pattern is determined corresponding to the voltage value across the third capacitor in first preference.

5. A control method for controlling a multilevel power conversion circuit for converting DC power to AC power or AC power to DC power, one phase portion of the power conversion circuit including:

a first semiconductor switch series circuit that is connected between a positive terminal and a negative terminal of a DC power supply system having the positive terminal, the negative terminal, and a middle terminal, and composed of at least series-connected eight semiconductor switches each having an anti-parallel-connected diode;

a first capacitor that is connected in parallel to a series circuit of two semiconductor switches connected to a middle point of the first semiconductor switch series circuit;

a second capacitor that is connected in parallel to a series circuit of four semiconductor switches, two of which are in a one side of a middle point of the first semiconductor switch series circuit and two of which are in the other side of the middle point of the first semiconductor switch series circuit;

a third capacitor that is connected in parallel to a series circuit of six semiconductor switches, three of which are in a one side of a middle point of the first semiconductor switch series circuit and other three of which are in the other side of the middle point of the first semiconductor switch series circuit;

a second semiconductor switch series circuit that is connected in parallel to the third capacitor and composed of at least six series-connected semiconductor switches each having an anti-parallel connected diode;
a fourth capacitor that is connected in parallel to a series circuit of four semiconductor switches, two of which are in a one side of a middle point of the second semiconductor switch series circuit and two of which are in the other side of the middle point of the second semiconductor switch series circuit;
a fifth capacitor that is connected in parallel to a series circuit of two semiconductor switches each connected to a middle point of the second semiconductor switch series circuit; and
a bidirectional switch that is connected between the middle point of the second semiconductor switch series circuit and the middle terminal of the DC power supply system and is capable of bidirectional switching, the method comprising:
delivering a predetermined switching pattern of semiconductor switches when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential,
wherein a period of time for delivering the predetermined switching pattern is shorter than one carrier period of pulse width modulation control.

6. A control method for controlling a multilevel power conversion circuit for converting DC power to AC power or AC power to DC power, one phase portion of the power conversion circuit including:
a first semiconductor switch series circuit that is connected between a positive terminal and a negative terminal of a DC power supply system having the positive terminal, the negative terminal, and a middle terminal, and composed of at least series-connected eight semiconductor switches each having an anti-parallel-connected diode;
a first capacitor that is connected in parallel to a series circuit of two semiconductor switches connected to a middle point of the first semiconductor switch series circuit;
a second capacitor that is connected in parallel to a series circuit of four semiconductor switches, two of which are in a one side of a middle point of the first semiconductor switch series circuit and two of which are in the other side of the middle point of the first semiconductor switch series circuit;
a third capacitor that is connected in parallel to a series circuit of six semiconductor switches, three of which are in a one side of a middle point of the first semiconductor series circuit and other three of which are in the other side of the middle point of the first semiconductor series circuit;
a second semiconductor switch series circuit that is connected in parallel to the third capacitor and composed of at least six series-connected semiconductor switches each having an anti-parallel connected diode;
a fourth capacitor that is connected in parallel to a series circuit of four semiconductor switches, two of which are in a one side of a middle point of the second semiconductor switch series circuit and two of which are in the other side of the middle point of the second semiconductor switch series circuit;
a fifth capacitor that is connected in parallel to a series circuit of two semiconductor switches each connected to a middle point of the second semiconductor switch series circuit; and
a bidirectional switch that is connected between the middle point of the second semiconductor switch series circuit and the middle terminal of the DC power supply system and is capable of bidirectional switching, the method comprising:
delivering a predetermined switching pattern of semiconductor switches corresponding to a voltage value across at least one of the first through fifth capacitors when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential.

7. A control method for controlling a multilevel power conversion circuit for converting DC power to AC power or AC power to DC power, one phase portion of the power conversion circuit including:
a first semiconductor switch series circuit that is connected between a positive terminal and a negative terminal of a DC power supply system having the positive terminal, the negative terminal, and a middle terminal, and composed of at least series-connected eight semiconductor switches each having an anti-parallel-connected diode;
a first capacitor that is connected in parallel to a series circuit of two semiconductor switches connected to a middle point of the first semiconductor switch series circuit;
a second capacitor that is connected in parallel to a series circuit of four semiconductor switches, two of which are in a one side of a middle point of the first semiconductor switch series circuit and two of which are in the other side of the middle point of the first semiconductor switch series circuit;
a third capacitor that is connected in parallel to a series circuit of six semiconductor switches, three of which are in a one side of a middle point of the first semiconductor switch series circuit and other three of which are in the other side of the middle point of the first semiconductor switch series circuit;
a second semiconductor switch series circuit that is connected in parallel to the third capacitor and composed of at least six series-connected semiconductor switches each having an anti-parallel connected diode;
a fourth capacitor that is connected in parallel to a series circuit of four semiconductor switches, two of which are in a one side of a middle point of the second semiconductor switch series circuit and two of which are in the other side of the middle point of the second semiconductor switch series circuit;
a fifth capacitor that is connected in parallel to a series circuit of two semiconductor switches each connected to a middle point of the second semiconductor switch series circuit; and a bidirectional switch that is connected between the middle point of the second semiconductor switch series circuit and the middle terminal of the DC power supply system and is capable of bidirectional switching, the method comprising:
delivering a predetermined switching pattern of semiconductor switches when a potential at the middle point of the first semiconductor switch series circuit, the middle point being an AC terminal, changes from a positive side potential through a middle point potential to a negative side potential of the DC power supply system, or from the negative side potential through the middle point potential to the positive side potential, wherein selection of switching pattern is determined corresponding to preliminarily detected voltage values across the first through fifth capacitors.

8. The control method for controlling a multilevel power conversion circuit according to claim 7, wherein the selection of switching pattern is determined corresponding to the voltage value across the fifth capacitor in first preference.

\* \* \* \* \*